(12) United States Patent
Hashimoto

(10) Patent No.: US 8,717,604 B2
(45) Date of Patent: May 6, 2014

(54) IMAGE PROCESSING SYSTEM, IMAGE PROCESSING METHOD, AND PROGRAM FOR IMAGE PROCESSING METHOD

(75) Inventor: Hiroshi Hashimoto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 273 days.

(21) Appl. No.: 13/104,873

(22) Filed: May 10, 2011

(65) Prior Publication Data

US 2011/0279859 A1 Nov. 17, 2011

(30) Foreign Application Priority Data

May 17, 2010 (JP) .................................. 2010-113728
May 17, 2010 (JP) .................................. 2010-113729
Nov. 17, 2010 (JP) .................................. 2010-256700
Nov. 17, 2010 (JP) .................................. 2010-256701

(51) Int. Cl.
*G06F 3/12* (2006.01)
*G06K 15/00* (2006.01)
*H04N 1/00* (2006.01)

(52) U.S. Cl.
USPC .................... 358/1.15; 358/1.13; 358/1.18

(58) Field of Classification Search
USPC .................................................. 358/1.1–1.9
See application file for complete search history.

(56) References Cited

U.S. PATENT DOCUMENTS

| 7,136,179 B2* | 11/2006 | Ohara .......................... 358/1.15 |
| 2006/0256392 A1* | 11/2006 | Van Hoof et al. ............. 358/402 |
| 2010/0005159 A1* | 1/2010 | Ishiguro ........................ 709/221 |
| 2010/0231994 A1* | 9/2010 | Kashibuchi et al. .......... 358/505 |

FOREIGN PATENT DOCUMENTS

JP 2000-270148 A 9/2000

* cited by examiner

*Primary Examiner* — King Poon
*Assistant Examiner* — Ibrahim Siddo
(74) *Attorney, Agent, or Firm* — Fitzpatrick, Cella, Harper & Scinto

(57) ABSTRACT

In an image forming apparatus which is communicably connected to a management server for managing a scan ticket in which an instruction content for performing reading of a paper document is defined and can issue an instruction concerning printing to accumulated print jobs, when it is judged that the instruction concerning the printing is issued to the designated print job, a generation request of the scan ticket including reading setting for performing the reading of the paper document on which the print job has been printed is transmitted to the management server, a list of the scan tickets obtained from the management server is displayed, the reading of the paper document is performed using the scan ticket selected from list information of the displayed scan tickets, and an image obtained by the reading is transmitted to a transmission destination specified by the scan ticket.

8 Claims, 15 Drawing Sheets

IMAGE PROCESSING SYSTEM, IMAGE PROCESSING METHOD, AND PROGRAM FOR IMAGE PROCESSING METHOD

BACKGROUND OF THE INVENTION

1. Field of the Invention

The present invention relates to an image processing system, an image processing method, and a storage medium which stores a program for performing the image processing method, and, more particularly, to an image processing system which can easily perform reading by using a scan ticket, an image processing method which is applicable to the image processing system, and a storage medium which stores a program for performing the image processing method.

2. Description of the Related Art

Conventionally, in many companies, paper documents have been often digitized by an image processing apparatus. Further, since the image processing apparatus has been upgraded, various scan settings have been able to be performed in case of such digitizing.

In case of the digitizing, a scan condition must be set before actual scanning. Particularly, in a case where the documents of a same kind are scanned, although the settings for the documents to be scanned are all the same, such the same scan setting must be repetitively performed whenever the scanning is performed. Thus, there are problems of complicated operations and occurrence of setting errors.

Therefore, Japanese Patent Application Laid-Open No. 2000-270148 discloses a mechanism of causing a server to obtain a job template on which a scan condition has been described, and thus improving efficiency of a scan using the scan condition described on the obtained job template.

The mechanism disclosed in Japanese Patent Application Laid-Open No. 2000-270148 is merely to improve efficiency of the scan by using the job template (scan ticket). In this mechanism, the scan condition and a transfer destination are described in the scan ticket so as to transfer a scanned image using the job template (scan ticket). Incidentally, it is conceivable that the transfer destination includes information such as an image transfer destination, an image transfer destination path, an image file transfer protocol and the like.

In a procedure of transferring an image file, access to a server is generally restricted. Therefore, in case of storing the image file in the server, it is general to access a directory or the file after conducting authentication with input of a user name, a password and the like. Moreover, an authentication specification has been formulated also for a general file transfer protocol such as an FTP (File Transfer Protocol), an SMB (Server Message Block) or the like.

Therefore, when an image read using the scan ticket is transferred, authentication information such as the user name, the password and the like is necessary to access the image transfer destination.

There is a problem that, when the authentication information has previously been set in the scan ticket, a risk of a leak of the authentication information increases. The scan ticket is generally stored in the server, and an image processing apparatus and the server mutually exchange the scan ticket through a network. For example, in a case where the scan ticket is managed or controlled for each user, since the user obtains a scan ticket list from the server whenever the user logs in the image processing apparatus, the authentication information resultingly flows on the network whenever the user logs in the image processing apparatus. Further, if it is assumed that a server is provided on a network on an outside of company such as a cloud computing environment typified by an SaaS (Software as a Service), the authentication information resultingly flows on the network on the outside of company, whereby the risk of the leak of the authentication information increases more and more.

For this reason, it is conceivable to adopt a method of causing, without setting the authentication information to the scan ticket previously generated, a user to input the authentication information whenever an image actually read is transferred.

However, there is a case where the scan ticket is used to instruct a scan to anyone else. In such an operation, there is a problem that it is impossible to cause someone else to input the authentication information each time. For example, it is assumed a case where a boss issues an overtime work order to a subordinate in a company. In this case, the boss prints out and gives a written overtime work order to the subordinate, and the subordinate puts his/her signature and affixes his/her seal to the written overtime work order and transmits it to the boss using the scan ticket. In such an operation, in case of generating the scan ticket, the boss sets in advance the authentication information to the scan ticket so that the subordinate accesses the directory managed by the boss and transmits the read image to the relevant directory on the authority of the boss. Here, in case of adopting the method of causing the user to input the authentication information whenever transferring the image as described above, the subordinate cannot access the directory as long as the subordinate does not know the authentication information of the boss, whereby it is difficult for the subordinate to transmit the read image.

SUMMARY OF THE INVENTION

An object of the present invention is to provide a mechanism of, when an instruction concerning printing is issued to a print job, generating a scan ticket, thereby causing to easily perform a scan process for a paper document of the print job to which the instruction concerning printing is issued.

Another object of the present invention is to provide, in order to cause another user to perform reading, a mechanism of transmitting read setting information in case of performing reading to a paper document and transmission setting information including authentication information of a transmission destination for transmitting an image of the paper document read by the reading to different servers so as to generate a scan ticket and a transmission ticket, thereby enabling to perform the security-related transmission of the image obtained by the reading using the scan ticket.

To achieve the above objects, according to a first aspect of the present invention, there is provided an image forming apparatus which is communicably connected to a management server for managing a scan ticket in which an instruction content for performing reading of a paper document is defined, and can issue an instruction concerning printing in regard to an accumulated print job, the image forming apparatus comprising: a designation unit adapted to designate, from a list of the accumulated print jobs, the print job to be processed; an instruction judgment unit adapted to judge whether or not the instruction concerning the printing is issued to the print job designated by the designation unit; a generation request unit adapted to, in a case where it is judged by the instruction judgment unit that the instruction concerning the printing is issued to the designated print job, issue a generation request of the scan ticket including read setting for performing the reading of the paper document on which the print job has been printed, to the management server; a display control unit adapted to display a list of the scan tickets obtained from the management server; a user operation accepting unit adapted to accept selection of the scan ticket from list information of the scan tickets displayed on a display unit by the display control unit; and a transmission unit adapted to perform the reading of the paper document using the scan ticket accepted by the user operation accepting unit, and transmit an image obtained by the reading to a transmission destination specified by the scan ticket.

Further, to achieve the above objects, according to a second aspect of the present invention, there is provided an image forming apparatus which is communicably connected to a first management server for managing a scan ticket in which an instruction content for performing reading of a paper document is defined and a second management server for managing a transmission ticket in which a transmission destination of an image of the paper document read using the scan ticket is defined, the image forming apparatus comprising: a login unit adapted to log in the image forming apparatus; an input unit adapted to input reading setting information in case of performing the reading of the paper document and transmission setting information including authentication information of the transmission destination to which the image of the paper document read by the reading is transmitted, so as to cause another user to perform the reading; a first generation request unit adapted to issue a generation request of the scan ticket including the reading setting information to perform the reading of the paper document, to the first management server according to the input by the input unit; a second generation request unit adapted to issue a generation request of the transmission ticket including the transmission setting information to transmit the image of the paper document read using the scan ticket, to the second management server according to the input by the input unit; a display control unit adapted to display a list of the scan tickets obtained from the first management server; a user operation accepting unit adapted to accept selection of the scan ticket from list information of the scan tickets displayed on a display unit by the display control unit; and an image transmission unit adapted to transmit the image obtained by the reading to the second management server, to perform the reading of the paper document using the scan ticket accepted by the user operation accepting unit and transmit the image obtained by the reading to a predetermined transmission destination using authentication information of the transmission ticket specified by the scan ticket.

Further features of the present invention will become apparent from the following description of exemplary embodiments with reference to the attached drawings.

DESCRIPTION OF THE EMBODIMENTS

Hereinafter, an information processing system 1 according to a preferred embodiment of the present invention will be described in detail with reference to the attached drawings.

Figure 1:
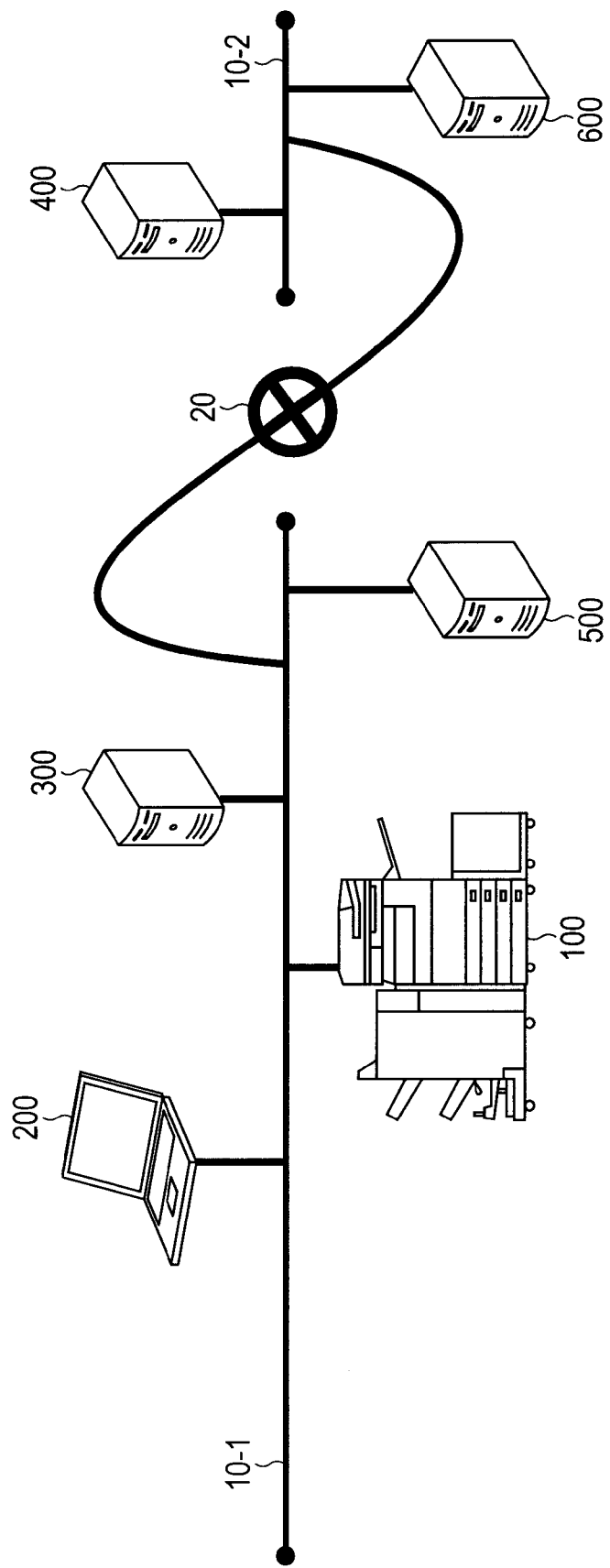
FIG. 1 is a diagram illustrating an example of a configuration of an information processing system 1 according to the present invention.

FIG. 1 is a diagram illustrating an example of a configuration of the information processing system 1 according to the present invention.

As illustrated in FIG. 1, one or plural multifunction devices 100, one of plural client PCs 200, a print server 300, a file transmission server 500 and a file server 600 which are installed on each floor of a building are connected to others through a LAN (local area network) 10-1. Further, a scan ticket server 400 and the file server 600 are connected to each other through a LAN 10-2. Furthermore, the LAN 10-1 and the LAN 10-2 are connected to each other through a WAN (wide area network) 20.

For example, the LAN 10-1 may be an in-base network at each base of a company, the LAN 10-2 may be a network in the main office of the company. Here, the LANs 10-1 and the LAN 10-2 are connected to others through the WAN 20 such as a public line or the like.

Further, for example, the LAN 10-1 may be an in-house network of each company, and the LAN 10-2 may be a network in a company which provides a web service such as a cloud computing service capable of being used by other companies. Here, the LAN 10-1 and the LAN 10-2 are connected to each other through the WAN 20 such as a public line or the like.

The multifunction device 100 is the image forming apparatus which has various functions such as a print function, a scan function, a copy function, a facsimile function and the like.

The client PC 200 is the apparatus which is communicably connected to the LAN 10 (i.e., the LANs 10-1 and 10-2). Also, the client PC 200 is the PC which performs setting of the multifunction device 100, and is also the PC which has a function (e.g., Internet Explore™ available from Microsoft) communicable with the multifunction device 100 in an HTTP (Hyper Text Transfer Protocol) through the network. Further, the client PC 200 is the PC by which a print job is input from a user. Therefore, the client PC 200 generates the print job from an application through a printer driver in response to a user's instruction, and the printer driver can transmit the print job to the multifunction device 100 by using an LPR (Line PRinter daemon) protocol or another print protocol. Further, the client PC 200 is the apparatus which accepts data scanned by the multifunction device 100.

The print server 300 is the apparatus which receives a print job 920 (FIG. 16) from the client PC 200, analyzes the received print job 920, and then accumulates the analyzed print job. Further, the print server 300 is the apparatus which has a function of receiving a print request from the multifunction device 100, searching for the print job 920 of a user from the accumulated print jobs on the basis of a user name included in the print request, and instructing the multifunction device 100 to perform printing of the searched print job 920 of the user.

Incidentally, the print server 300 may be constituted by a single server. Further, the print server 300 may be constituted by two servers, i.e., a primary server and a secondary server. Furthermore, the print server 300 may be constituted by three or more servers.

Incidentally, the function of the print server 300 may be carried out on the multifunction device 100. When the function of the print server 300 is carried out on the multifunction device 100, a range in which the print job 920 can be transferred is limited to the print jobs managed by the multifunction device 100. Thus, convenience deteriorates, but costs for constituting the print server 300 reduces. Therefore, it is possible to select either.

The scan ticket server 400 (first management server) is the apparatus which holds scan reservation information. A scan ticket 930 (FIG. 17) which stores therein the scan reservation information (scan setting, etc.) is stored in a scan ticket storage unit 410 (FIG. 4). In other words, the scan ticket is the scan ticket in which instruction contents for performing reading of a paper document by a scanner 3060 (FIG. 3) has been defined.

The scan ticket server 400 performs various processes such as a process of creating a list, a process of generating a ticket, a process of making a ticket effective, a process of deleting a ticket, and the like, in response to requests from the multifunction device 100. The scan ticket server 400 may be constituted in a chassis identical with that for the file transmission server 500 or that for the file server 600.

The file transmission server 500 (second management server) is the relay apparatus for storing, in the file server 600, a file scanned by the multifunction device 100. The file transmission server 500 stores therein a transmission ticket 940 (FIG. 18), and thus can perform authentication and file transmission to the file server 600 based on the contents of the transmission ticket 940. Here, as for authentication information, a fixed account may be set in advance to the file server 600, or account information may be read from the transmission ticket 940.

The file server 600 is the apparatus for storing the file to be shared by plural users, or performing access control to each user.

The file server 600 may be an apparatus which has a simple file management function, or an apparatus which can simply exchange the file by using a shared directory like a client PC for personal use. Also, the file server 600 may be a document management server which has a file version management function, an audit function and the like, or a work flow server which manages a voucher or the like scanned based on a business work flow such as a transportation expense application flow or the like. In any constitution, the file server 600 is the apparatus which can store the file in a specific directory.

Subsequently, the details of the multifunction device 100, the client PC 200, the print server 300, the scan ticket server 400, the file transmission server 500 and the file server 600 will be described with reference to FIGS. 2 and 3.

Figure 2:
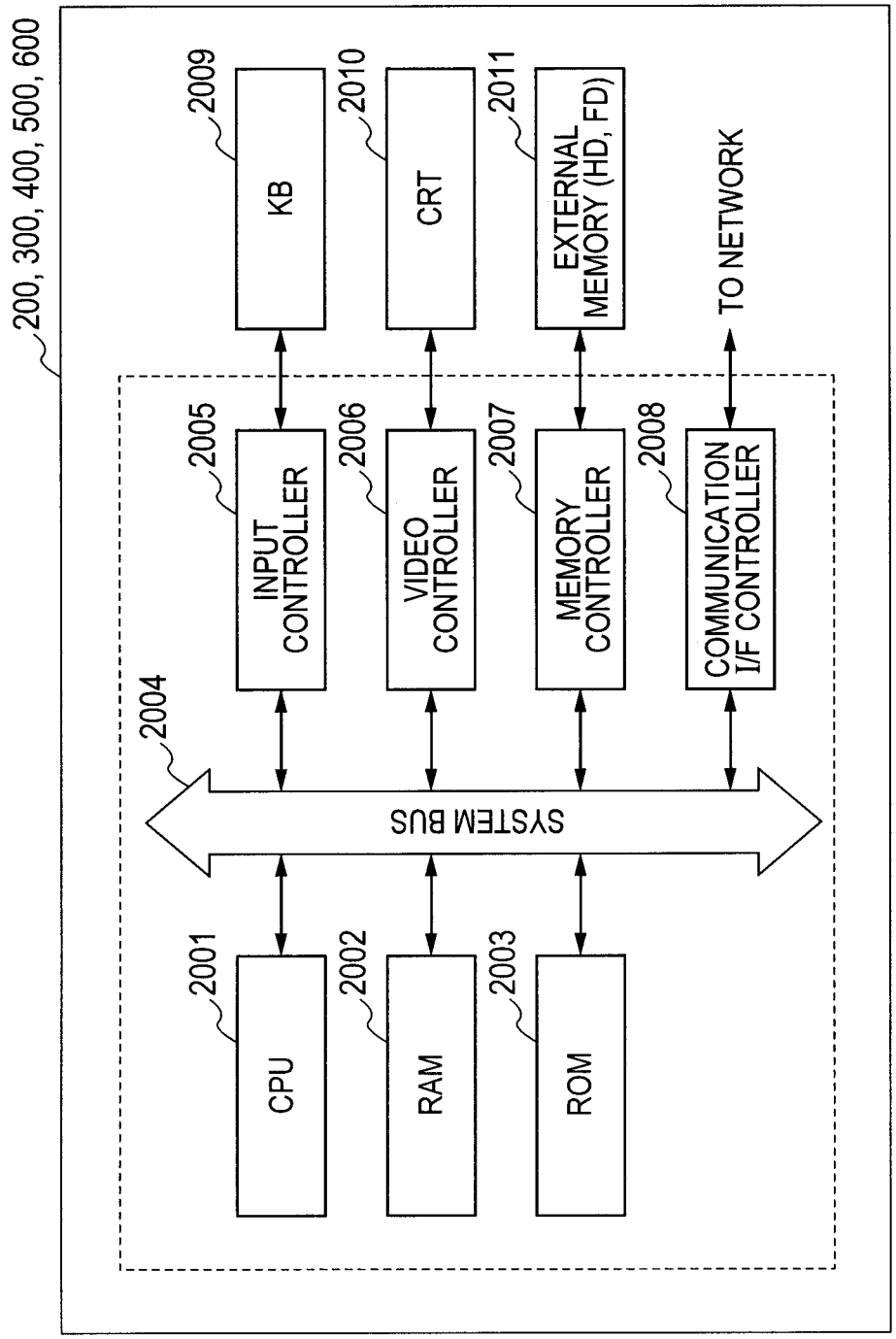
FIG. 2 is a block diagram illustrating an example of a hardware constitution of each of a client PC (personal computer) 200, a print server 300, a scan ticket server 400, a file transmission server 500 and a file server 600.
Figure 3:
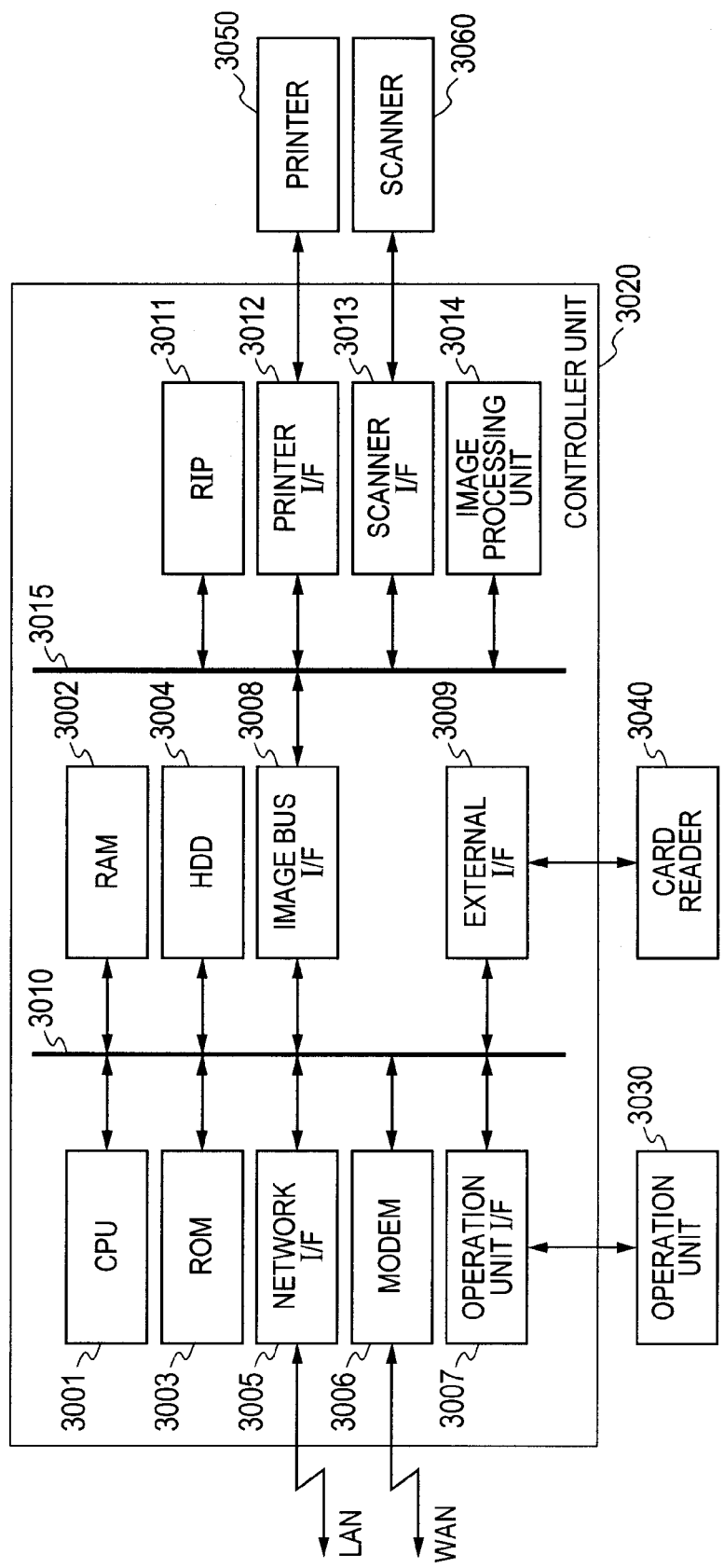
FIG. 3 is a block diagram illustrating an example of a hardware constitution of a multifunction device 100.
Figure 4:
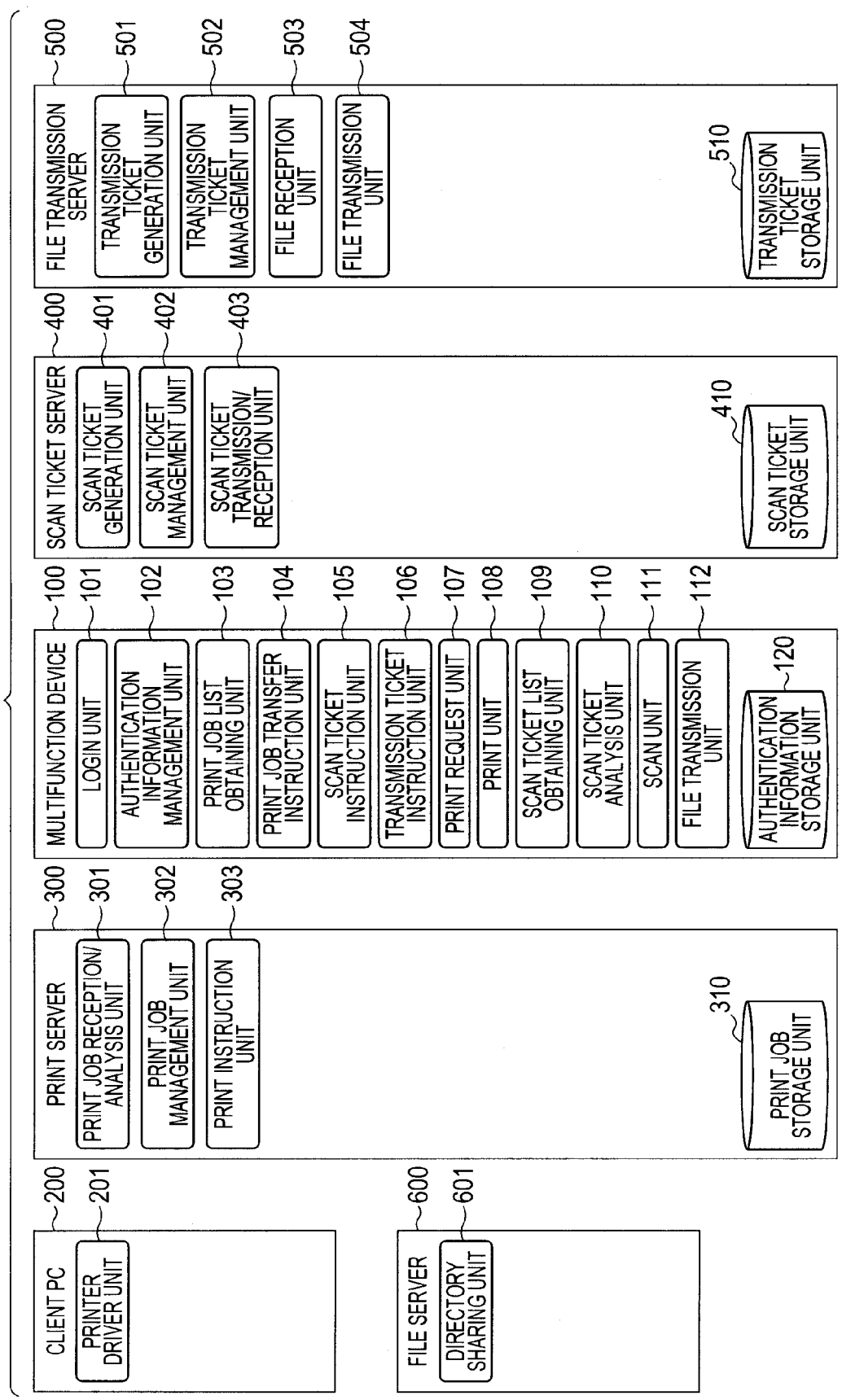
FIG. 4 is a block diagram illustrating function constitutions of the information processing system 1.

Namely, FIG. 2 is the block diagram illustrating the hardware constitution of each of the client PC 200, the print server 300, the scan ticket server 400, the file transmission server 500 and the file server 600, and FIG. 3 is the block diagram illustrating the hardware constitution of the multifunction device 100.

As illustrated in FIG. 2, in each of the client PC 200, the print server 300, the scan ticket server 400, the file transmission server 500 and the file server 600, a CPU (central processing unit) 2001, a RAM (random access memory) 2002, a ROM (read only memory) 2003, an input controller 2005, a video controller 2006, a memory controller 2007, and a communication I/F (interface) controller 2008 are mutually connected through a system bus 2004.

The CPU 2001 totally controls respective devices and controllers connected to the system bus 2004.

The ROM 2003 or an external memory 2011 such as an HD (hard disk), an FD (flexible disk) or the like stores therein a BIOS (Basic Input/Output System) and an OS (operating system) which respectively act as control programs of the CPU 2001, various programs to be performed by each server or each PC, and the like.

The RAM 2002 functions as a main memory, a working area and the like for the CPU 2001. Consequently, the CPU 2001 loads programs and the like necessary to perform various processes from the ROM 2003 or the external memory 2011 to the RAM 2002, and performs the loaded programs, thereby achieving various operations.

The input controller 2005 controls various inputs from a KB (keyboard) 2009, and a pointing device such as a mouse (not illustrated) and the like.

The video controller 2006 controls a display on a display device such as a CRT (cathode ray tube) 2010 or the like. Here, it should be noted that the display device is not limited to the CRT, and it is of course possible to use other display devices such as a liquid crystal display and the like. In any case, the display devices are used by an administrator as necessary.

The memory controller 2007 controls access to the external memory 2011 such as the HD of storing therein a boot program, various applications, font data, a user file, an editing file, various data and the like, the FD, a CompactFlash™ memory connected to a PCMCIA (Personal Computer Memory Card International Association) card slot through an adapter, an SSD (solid state device), or the like.

The communication I/F controller 2008, which is connected to an external device through a network such as the LAN 10, communicates with the external device, and performs a communication control process on the network. For example, the communication I/F controller 2008 can perform communication by using a TCP/IP (Transmission Control Protocol/Internet Protocol) or a UDP (User Datagram Protocol).

For example, the CPU 2001 can perform a display on the CRT 2010 by performing an extraction (rasterizing) process of an outline font to a display information region in the RAM 2002. Moreover, the CPU 2001 enables to perform a user instruction by a mouse cursor (not illustrated) or the like on the CRT 2010.

Various programs operating on the hardware of the client PC 200, the print server 300, the scan ticket server 400, the file transmission server 500 and the file server 600 are stored in the external memory 2011, loaded to the RAM 2002 as necessary, and performed by the CPU 2001. Also, a definition file, various information tables and the like to be used when the program operates are stored in the external memory 2011.

For example, a printer driver to be output to the print server 300 is stored in the external memory 2011 of the client PC 200. A program for extracting bibliographic information such as a job name, an output user name and the like from a print job accepted from the client PC 200, and unitarily managing the print job is stored in the external memory 2011 of the print server 300. Incidentally, it is also possible to make a constitution of performing extraction of the bibliographic information by the print server, transmitting the extracted bibliographic information to another server (not-illustrated bibliographic information management server), and thus managing the print jobs accumulated in the plural print servers.

Further, a program for generating the scan ticket in which the scan setting for a scan (i.e., the content of an instruction for performing the scan) has been defined, and storing information of the scan ticket to the multifunction device 100 is stored in the external memory 2011 of the scan ticket server 400.

Furthermore, a program for accessing the file server 600, generating the transmission ticket in which the setting for transmitting scanned data (i.e., the content of an instruction for transmitting the scanned data) has been defined, and transmitting the data to the file server 600 according to the transmission ticket when the scanned data is received is stored in the external memory 2011 of the file transmission server 500. A document management program for managing a file is stored in the external memory 2011 of the file server 600, whereby the file including the scanned data is managed.

Subsequently, the hardware constitution of the multifunction device 100 will be described.

As illustrated in FIG. 3, the multifunction device 100 includes hardware constitutions of a controller unit 3020, an operation unit 3030, a card reader 3040, a printer 3050 and a scanner 3060.

Further, the controller unit 3020 includes hardware constitutions of a CPU 3001, a RAM 3002, a ROM 3003, an HDD (hard disk drive) 3004, a network I/F 3005, a modem 3006, an operation unit I/F 3007, an image bus I/F 3008, an external I/F 3009, a system bus 3010, an RIP (raster image processor) 3011, a printer I/F 3012, a scanner I/F 3013, an image processing unit 3014 and an image bus 3015.

The controller unit 3020 is connected to the scanner 3060 which functions as an image input device, and the printer 3050 which functions as an image output device. Also, the controller unit 3020 is connected to the LAN 10, and a WAN (wide area network) such as a PSTN (public switched telephone network), an ISDN (Integrated Services Digital Network) or the like, thereby inputting and outputting image data and device information.

The CPU 3001 is the processor which is connected to the system bus 3010 and the image bus 3015, and thus controls the respective devices totally.

The RAM 3002 is the work memory which is used when the CPU 3001 operates. Also, the RAM 3002 has a function of a program memory for storing programs, and a function of an image memory for temporarily storing image data. For example, a card ID (identification) read by the card reader 3040 or the like is stored in the RAM 3002.

Figure 14:
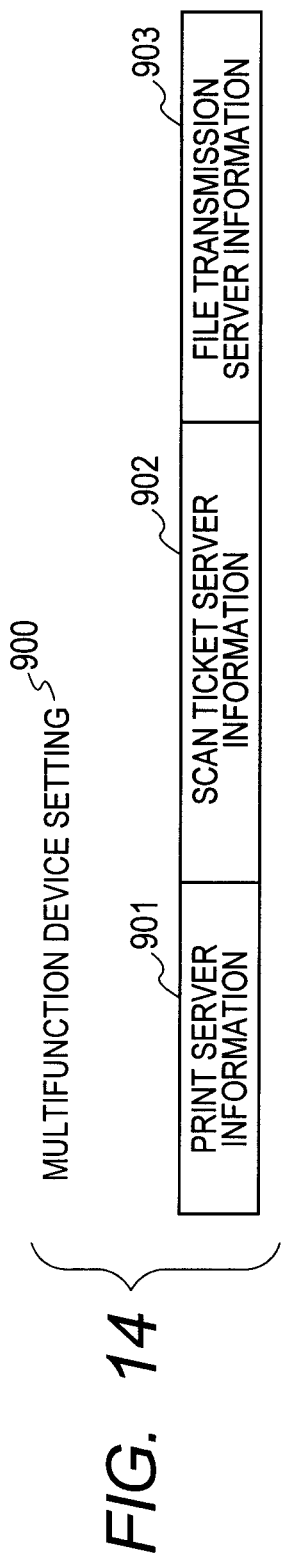
FIG. 14 is a diagram illustrating an example of multifunction device setting 900.

The ROM 3003 stores therein a boot program of the system, and various control programs. The HDD 3004 stores therein various programs to be used for controlling the system, and image data. Incidentally, multifunction device setting 900 illustrated in FIG. 14 is stored in the ROM 3003 or the HDD 3004. Incidentally, the HDD 3004 is the medium which permanently sores information, and a form of the medium is not limited to the HDD. For example, an SSD (solid state driver) or the like can be used as the medium.

The network I/F 3005 is connected to the LAN 10 to input and output data. The modem 3006 is connected to the WAN to input and output transmission data, reception data and the like in facsimile communication.

The operation unit I/F 3007 is the interface of the operation unit 3030 which serves as the UI (user interface), and outputs image data to be output to the operation unit 3030. Further, the operation unit I/F 3007 acts to notify the CPU 3001 of the information (e.g., user information) input by a user of the system from the operation unit 3030. Incidentally, the operation unit 3030 includes a display unit which has a touch panel corresponding to a keyboard. Thus, when a keyboard button displayed on the display unit is depressed by the user (or touched by a finger of the user), various kinds of instructions can be generated or issued.

The image bus I/F 3008 is the bus bridge which connects the system bus 3010 to the image bus 3015 of transferring image data at high speed, thereby converting data constitution.

The external I/F 3009 is the interface which accepts external inputs from a USB (universal serial bus), an IEEE1394 (Institute of Electrical and Electronics Engineers 1394) bus, a printer port, an RS-232C (Recommended Standard 232C) port and the like. In the present embodiment, the card reader 3040 for reading information of an IC (integrated circuit) card which is necessary in IC card authentication is connected to the external I/F 3009. Further, the CPU 3001 can control the card reader 3040 to read the information from the IC card through the external I/F 3009, whereby the information read from the IC card can be obtained.

The above-described devices 3001 to 3009 are arranged on the system bus 3010, and these devices can mutually communicate with others.

The RIP 3011 extracts vector data such as a PDL (page description language) code or the like into bitmap image data.

The printer I/F 3012 connects the printer 3050 and the controller unit 3020 to each other, and performs synchronous system/asynchronous system conversion to the image data.

The scanner I/F 3013 connects the scanner 3060 and the controller unit 3020 to each other, and performs synchronous system/asynchronous system conversion to the image data.

The image processing unit 3014 performs a correction process, a working process and an editing process to input image data, and also performs a printer correction process, a resolution conversion process and the like to print output image data. In addition, the image processing unit 3014 performs an image data rotation process, compression and extraction processes to multivalued image data in a method such as a JPEG (Joint Photographic Experts Group) method, and compression and extraction processes to binary image data in a method such as a JBIG (Joint Bi-level Image experts Group) method, an MR (Modified READ) method, an MMR (Modified Modified READ) method, an MH (Modified Huffman) method or the like.

The above-described devices 3008 and 3011 to 3014 are arranged on the image bus 3015, and these devices can mutually communicate with others. For example, the image bus 3015 is constituted by a PCI (Peripheral Computer Interconnect) bus or the IEEE1394 bus.

Concretely, the operation unit 3030 has an LCD (liquid crystal display) unit on which a touch panel sheet has been attached to display an operation screen of the system. When a key (button) on the displayed operation screen is depressed, position information of the depressed key is transferred to the CPU 3001 through the operation unit I/F 3007. Further, the operation unit 3030 has keyboard functions which act as, for example, a start key, a stop key, an ID key, a reset key and the like, as various operation keys.

Here, the start key of the operation unit 3030 is operated, for example, when a reading operation of an original document is started. For example, a red/green LED (light emitting diode) is provided at the center of the start key, and a user can know based on the color of emitted light whether or not the start key is in a usable state. Further, the stop key of the operation unit 3030 is operated, for example, when a running operation is stopped. Furthermore, the ID key of the operation unit 3030 is operated, for example, when a user ID of the user is input. Furthermore, the reset key of the operation unit 3030 is operated, for example, when the setting by the operation unit 3030 is initialized.

The card reader 3040 is used to read user discrimination information which is stored in the IC card (e.g., FeliCa™ manufactured by Sony Corporation) corresponding to an authentication card. The user discrimination information read by the card reader 3040 is notified to the CPU 3001 through the external I/F 3009.

The printer 3050 converts, for example, raster image data to form an image on a paper in any one of conversion methods such as a photoelectric method using a photosensitive drum and a photosensitive belt, an inkjet method of directly printing an image on a paper by emitting inks from a micro-nozzle array, and the like. A print operation of the printer 3050 is started in response to an instruction from the CPU 3001. Incidentally, plural paper feed stages are provided in the printer 3050 so as to enable a user to select different paper sizes and different paper directions, and corresponding paper cassettes are set to the respective paper feed stages.

The scanner 3060 irradiates an image on a paper of an original, scans the original by using a CCD (charge coupled device) line sensor, and converts the scanned original image into an electrical signal as raster image data. The original paper is set on a tray of an original feeder. Then, when a reading start instruction is issued by the user of the multifunction device 100 through the operation unit 3030, the CPU 3001 instructs the scanner 3060 to feed the original papers one by one and perform the reading operation of the original image.

By the above-described constitutions, the multifunction device 100 can transmit the image data read from the scanner 3060 to the LAN 10, and output and print the print data received from the LAN 10 by the printer 3050. Further, the multifunction device 100 can facsimile-transmit the image data read from the scanner 3060 from the modem 3006 to the WAN, and output and print the image data facsimile-received from the WAN by the printer 3050.

Subsequently, functions and used data in the information processing system 1 will be described with reference to FIGS. 4, 12, 13, 14, 15, 16, 17 and 18.

Figure 12:
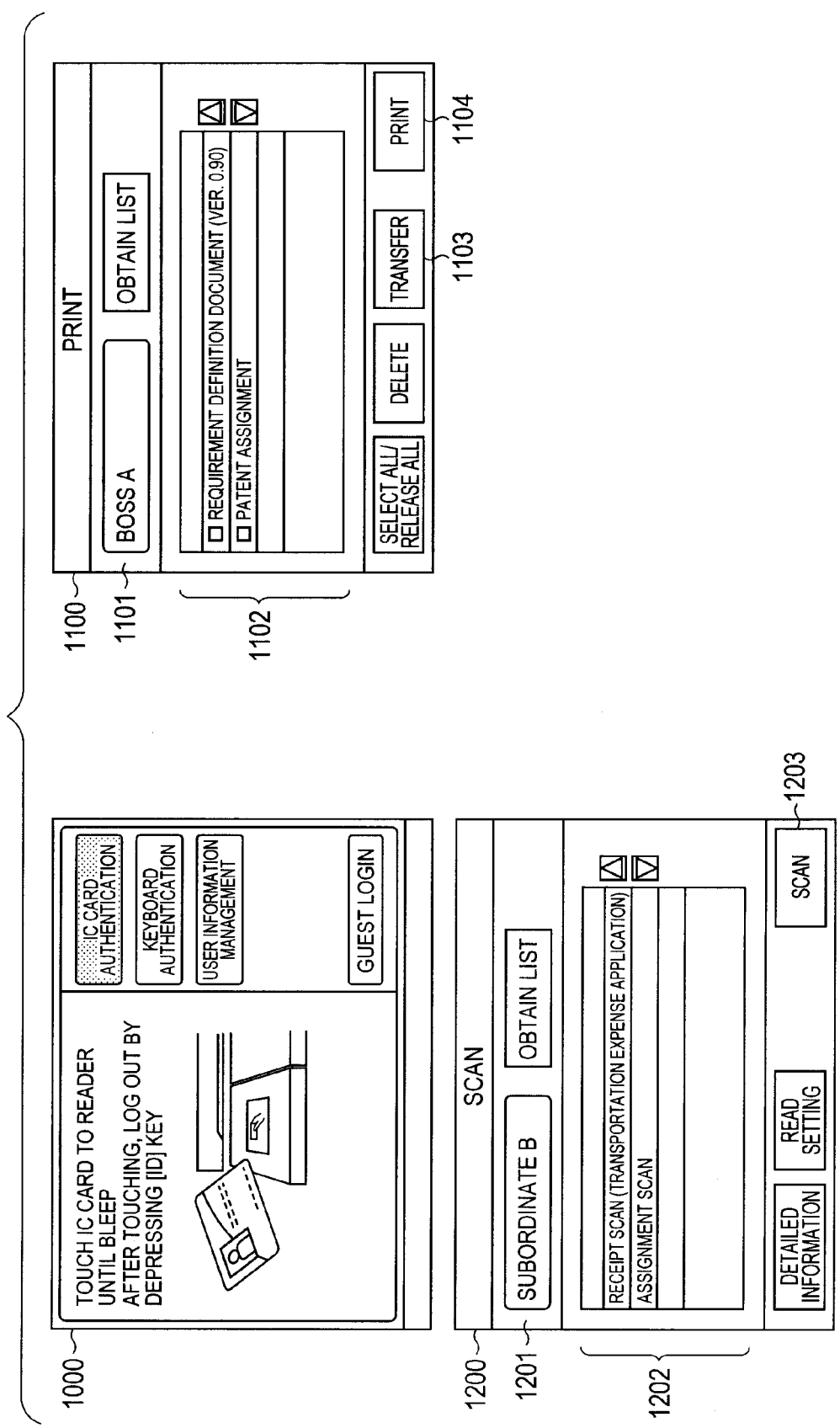
FIG. 12 is a diagram illustrating an example of screens to be displayed on an operation unit 3030 of the multifunction device 100.
Figure 13:
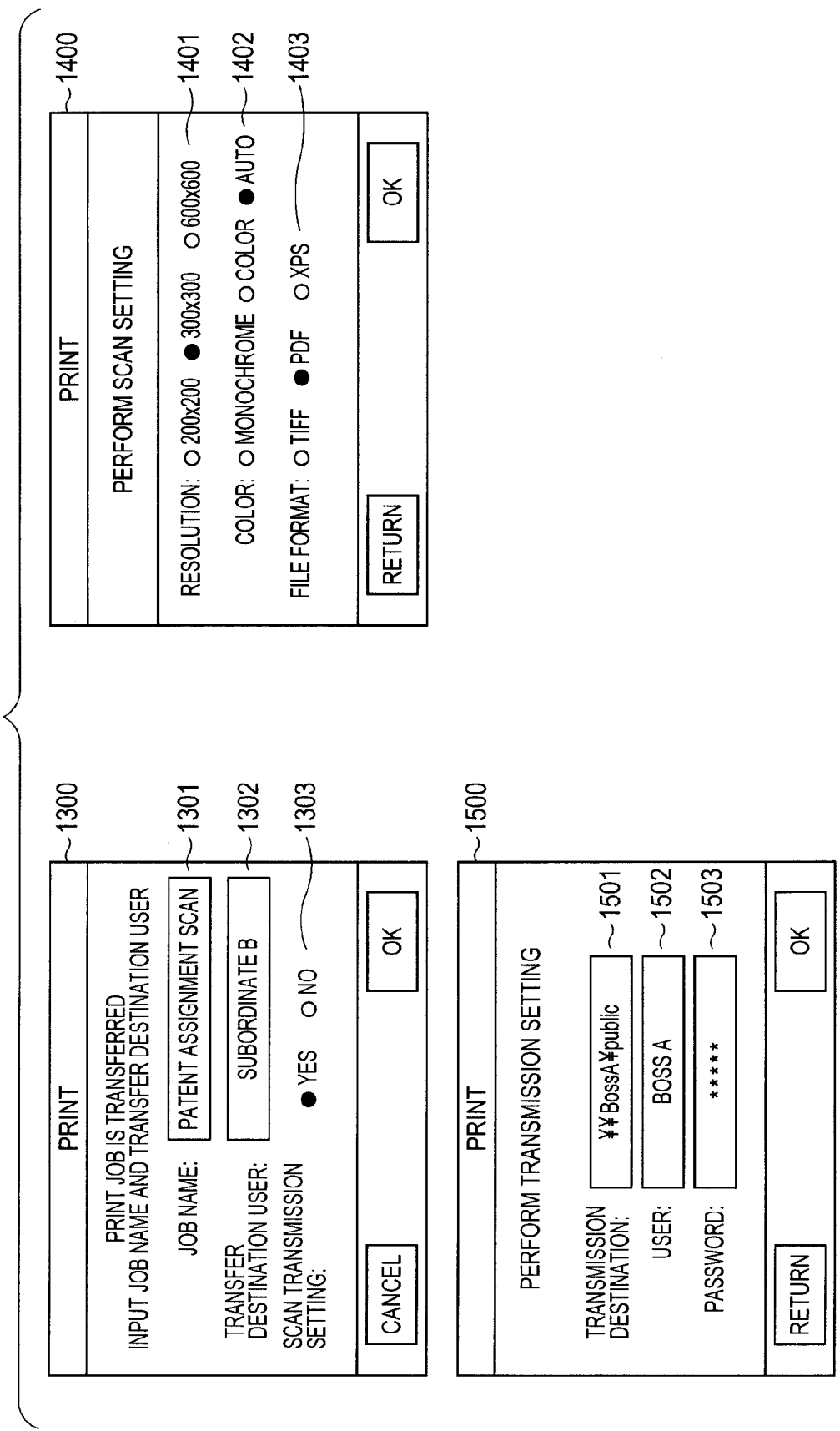
FIG. 13 is a diagram illustrating an example of screens to be displayed on the operation unit 3030 of the multifunction device 100.
Figure 15:
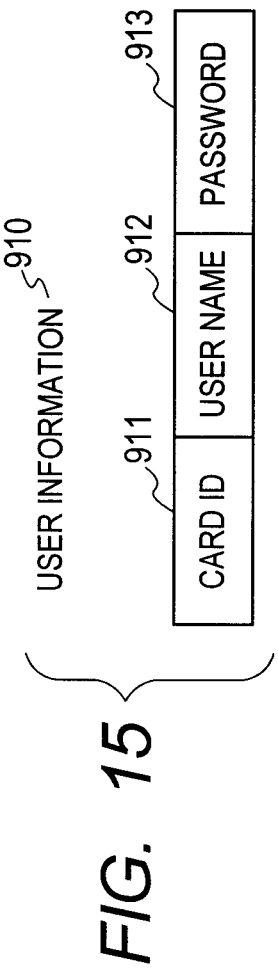
FIG. 15 is a diagram illustrating an example of user information 910.
Figure 16:
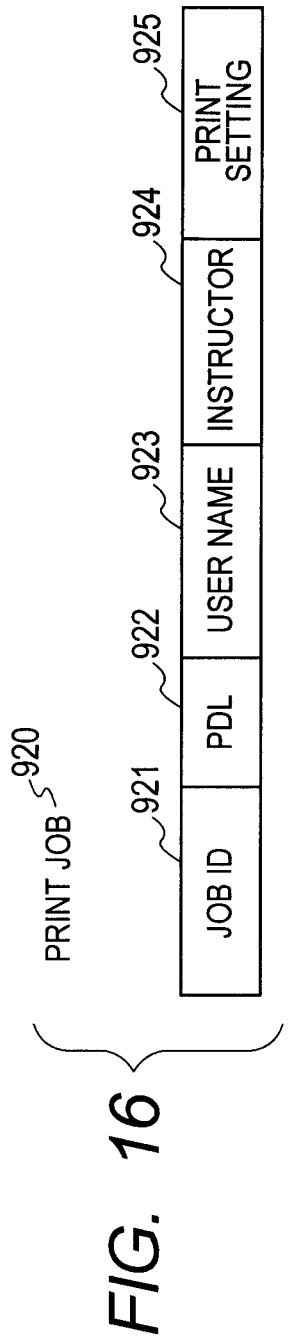
FIG. 16 is a diagram illustrating an example of a print job 920.
Figure 17:
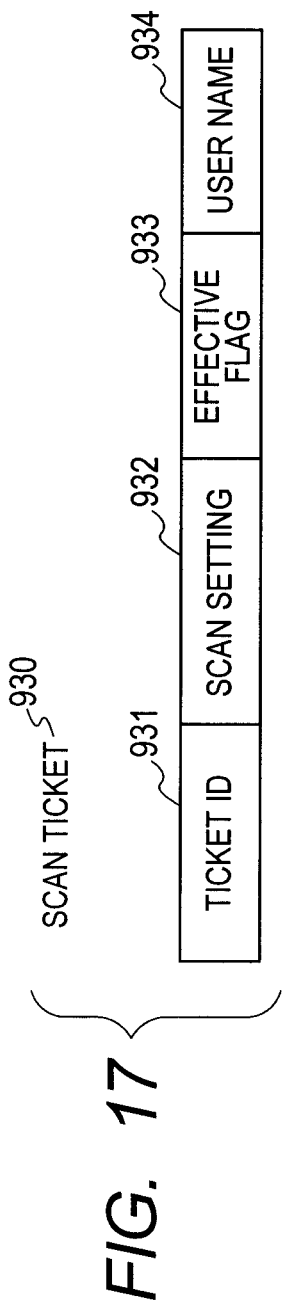
FIG. 17 is a diagram illustrating an example of a scan ticket 930.
Figure 18:
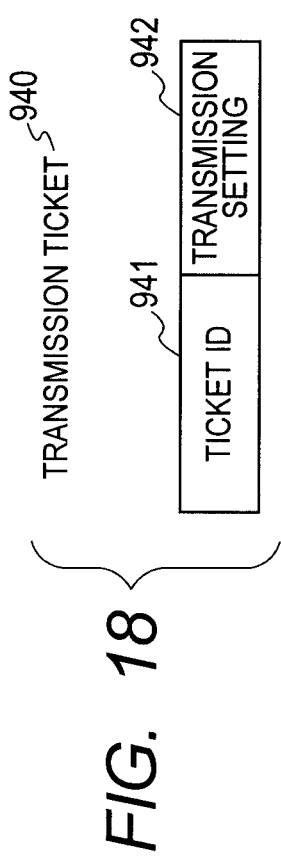
FIG. 18 is a diagram illustrating an example of a transmission ticket 940.

FIG. 4 is the block diagram illustrating the function constitutions of the information processing system 1. FIG. 12 is the diagram illustrating an example of screens to be displayed on the operation unit 3030 of the multifunction device 100. FIG. 13 is the diagram illustrating an example of screens to be displayed on the operation unit 3030 of the multifunction device 100. FIG. 14 is the diagram illustrating an example of the multifunction device setting 900. FIG. 15 is the diagram illustrating an example of user information 910. FIG. 16 is the diagram illustrating an example of the print job 920. FIG. 17 is the diagram illustrating an example of the scan ticket 930. FIG. 18 is the diagram illustrating an example of the transmission ticket 940.

The functions of the respective devices according to the present embodiment will be described with reference to FIG. 4.

First, the function for performing the process of the client PC 200 will be described.

The client PC 200 includes a printer driver unit 201 and the like.

The printer driver unit 201 converts image data generated by the application into PDL data which can be printed by the multifunction device 100, and further creates the print job 920 by adding bibliographic information to the PDL data.

As illustrated in FIG. 16, the print job 920 is constituted by a job ID 921, a PDL 922, a user name 923, an instructor (a person who issues an instruction) 924, a print setting 925, and the like. The job ID 921 is the ID which is used to uniquely discriminate or identify the print job 920, and the PDL 922 is the substance of the print data described by the PDL being printable by the multifunction device 100. The user name 923 corresponds to the user who generates the print job 920, and is the information to be used to discriminate the owner of the print job 920. Further, the user name 923 is rewritten into a user name of a transfer destination when the print job 920 is transferred. The instructor 924 is the information which is used to discriminate the former owner in a case where the print job 920 is transferred. Although any setting is not performed when the print job 920 is generated, the value of the former user name 923 is set at timing when the print job 920 is transferred. The print setting 925 includes various print settings such as the number of prints, one-sided/two-sided print, color/monochrome print, and the like. Also, information such as a job name being a name of the print job, time of day when the print job is input, and the like is set.

Next, the function for performing the process of the print server 300 will be described.

The print server 300 includes a print job reception/analysis unit 301, a print job management unit 302, a print instruction unit 303, a print job storage unit 310, and the like.

The print job reception/analysis unit 301 receives the print job 920 from the client PC 200 by using a print protocol such as an LPR (Line PRinter daemon), a RAW or the like, analyzes the received print job 920, and then analyzes the set user name 923, the print setting 925 and the like.

The print job management unit 302 writes the print job 920 to the print job storage unit 310, and rewrites and deletes the print job 920 stored in the print job storage unit 310. More specifically, the print job management unit 302 obtains a print job list of the relevant user, rewrites the user name 923 of the print job 920, and deletes the print job 920.

The print job storage unit 310 stores therein one or plural print jobs 920 being the information stored in the external memory 2011 of the print server 300.

Next, the function for performing the process of the scan ticket server 400 will be described.

The scan ticket server 400 includes a scan ticket generation unit 401, a scan ticket management unit 402, a scan ticket transmission/reception unit 403, the scan ticket storage unit 410, and the like.

The scan ticket generation unit 401 generates the scan ticket 930 in response to an instruction from an external device. Incidentally, the scan ticket generation is requested from the multifunction device 100 at a time when the print job 920 is transferred on the multifunction device 100 in the present embodiment. However, the generation of the scan ticket may be requested from a work flow server according to a state of a work flow. For example, in the business work flow, the scan ticket 930 for transportation expense scan may be generated at a time when a transportation expense is applied.

The scan ticket management unit 402 writes the scan ticket 930 to the scan ticket storage unit 410, rewrites an effective flag 933 (FIG. 17) of the scan ticket 930, and deletes the scan ticket 930.

The scan ticket transmission/reception unit 403 transmits and receives the scan ticket 930 in response to an instruction from the external device.

The scan ticket storage unit 410 stores therein one or plural scan tickets 930 being the information stored in the external memory 2011 of the scan ticket server 400.

As illustrated in FIG. 17, the scan ticket 930, which is the information for storing in advance a scan attribute at a time when a scan is performed, includes a ticket ID 931, a user name 934, a scan setting 932, the effective flag 933, and the like.

The ticket ID 931 is the information which is used to uniquely discriminate or identify the scan ticket 930. With respect to the scan ticket 930 which is generated when the print job 920 is transferred, the value same as that of the job ID 921 of the print job 920 is set. Thus, the print job 920 and the scan ticket 930 can be tied to each other.

The user name 934 is the information which is used to discriminate or identify a user who has the scan ticket 930.

The scan setting 932 is the information concerning the scan attribute. For example, the scan attribute to be stored as the scan setting 932 includes a scan color, resolution, two-sided reading, a reading density, a file format and the like.

The effective flag 933 is the information which is used to manage effectiveness/ineffectiveness of the scan ticket 930. There is a case where inconvenience occurs in business if the scan ticket 930 can be used immediately after it was generated. In this connection, it is possible by using the effective flag 933 to set the scan ticket 930 to be ineffective when it is generated, and make the scan ticket 930 effective when a certain condition is satisfied after it was generated. In any case, the detail of the effective flag 933 will be described later.

Subsequently, the function for performing the process of the file transmission server 500 will be described.

The file transmission server 500 includes a transmission ticket generation unit 501, a transmission ticket management unit 502, a file reception unit 503, a file transmission unit 504, a transmission ticket storage unit 510, and the like.

The transmission ticket generation unit 501 generates the transmission ticket 940 in response to an instruction from the external device.

The transmission ticket management unit 502 writes the transmission ticket 940 to the transmission ticket storage unit 510, and deletes the transmission ticket 940.

The file reception unit 503 receives the file from the external device, by using a protocol such as the FTP (File Transfer Protocol), the SMB (Server Message Block), a WebDAV (Web-based Distributed Authoring and Versioning) or the like.

The file transmission unit 504 transmits the file to the external device such as the file server 600 or the like, by using the protocol such as the FTP, the SMB, the WebDAV or the like. In this case, when authentication is necessary, the file transmission unit 504 performs the authentication by using a protocol such as a Kerberos, an NTLM (Windows NT LAN Manager authentication) or the like.

The transmission ticket storage unit 510 stores therein one or the plural transmission tickets 940 being the information stored in the external memory 2011 of the file transmission server 500.

As illustrated in FIG. 18, the transmission ticket 940 includes a ticket ID 941, a transmission setting 942 and the like.

The ticket ID 941 is the information which is used to uniquely discriminate or identify the transmission ticket 940. Since the transmission ticket 940 is used together with the scan ticket 930, the value same as that of the ticket ID 931 of the scan ticket 930 is set to the transmission ticket 940.

The transmission setting 942 is the information to be used to transmit the file to the file server 600. More specifically, account information such as a user name, a password, a domain and the like, and information such as a storage-designation directory, a file name and the like are set to the transmission setting 942. In a case where fixed account information has previously been set to the file transmission server 500, information to be tied to the fixed account information is set to the transmission setting 942. More specifically, document classifications such as transmission setting for a transportation expense application, transmission setting for a written overtime work order, and the like are set to the transmission setting 942.

Subsequently, the function for performing the process of the file server 600 will be described.

The file server 600 includes a directory sharing unit 601 and the like.

The directory sharing unit 601 stores the file in a storage device of the file server 600 so that the stored file is shared by plural users, and performs access control with respect to each user. Also, the directory sharing unit 601 has a function for performing authentication when the authentication is necessary to access the directory or the file.

Subsequently, functions for performing the process of the multifunction device 100 will be described.

The multifunction device 100 includes a login unit 101, an authentication information management unit 102, a print job list obtaining unit 103, a print job transfer instruction unit 104, a scan ticket instruction unit 105, a transmission ticket instruction unit 106, a print request unit 107, a print unit 108, a scan ticket list obtaining unit 109, a scan ticket analysis unit 110, a scan unit 111, a file transmission unit 112, an authentication information storage unit 120, and the like.

The login unit 101 has the function to cause the user to log in the multifunction device 100. In this connection, the user information 910 is temporarily stored as login user information in the multifunction device 100 until the user logs out of the device.

The authentication information management unit 102 has the function to judge whether or not the user can log in the device. More specifically, when the user sets a card authentication screen and holds the IC card over the card reader 3040, the authentication information management unit 102 searches for, from the user information 910, the user information which is coincident with the card ID of the held IC card. For example, when the user inputs a user name, a password and a domain on a keyboard authentication screen and then depresses a login button, the user is searched and password check is performed based on the user information 910. Incidentally, the authentication control may not be performed by the multifunction device 100, but may be performed by another separate device such as an authentication server or the like.

The print job list obtaining unit 103 obtains a list of the print jobs 920 of the user who logged in the multifunction device 100, from the print server 300.

The print job transfer instruction unit 104 issues a transfer instruction of the print job 920 to the print server 300.

The scan ticket instruction unit 105 issues instructions for generating, making effective, and deleting the scan ticket 930, to the scan ticket server 400.

The transmission ticket instruction unit 106 issues instructions for generating and deleting the transmission ticket 940 to the file transmission server 500.

The print request unit 107 issues a print request of the print job 920 to the print server 300.

The print unit 108 is used to control the printer 3050 of the multifunction device 100. More specifically, the print unit 108 converts the PDL 922 included in the print job 920 into a bitmap image, and prints the obtained image on a medium such as a paper or the like by a known print technique.

The scan ticket list obtaining unit 109 issues a list obtaining instruction of the scan tickets 930 of the user who logged in the multifunction device 100, to the scan ticket server 400.

The scan ticket analysis unit 110 analyzes the scan ticket 930, obtains the scan attribute, and then sets the obtained scan attribute to the scan unit 111.

The scan unit 111 provides the function to digitize the image on the paper being the original, convert the digital image into an arbitrary image format, and transmit the digital image data of the arbitrary image format to an arbitrary folder of an arbitrary server, by controlling the scanner 3060 of the multifunction device 100. Here, as the file format, for example, it is possible to use a JPEG (Joint Photographic Experts Group) format, a TIFF (Tag Image File Format), a PDF (Portable Document Format), an XPS (XML Paper Specification) format, an OOXML (Office Open XML) format, or the like.

The file transmission unit 112 performs the file transmission to the external device by using a protocol such as an SMB (Server Message Block), a WebDAV (Web-based Distributed Authoring and Versioning), an FTP (File Transfer Protocol), or the like.

The authentication information storage unit 120 stores therein one or the plural user information 910 being the information to be stored in the HDD 3004 of the multifunction device 100.

As illustrated in FIG. 15, the user information 910, which is the information for managing the user capable of logging in the multifunction device 100, includes a card ID 911, a user name 912, a password 913, and the like. Here, the user information 910 is stored in the authentication information storage unit 120, and managed by the authentication information management unit 102.

The card ID 911, which serves as an external key for searching for the specific user information from the plural user information 910, is the information which is tied to the IC card that the user owns.

The user name 912, which is the name of the user who uses the multifunction device 100, is the information to be described on the operation log, the operation screen or the like of the multifunction device 100. Further, the user name 912 is used when the print job 920 of the user is specified by the print server 300, and when the scan ticket 930 of the user is specified by the scan ticket server 400.

The password 913 is the information for checking the user when the user authentication is performed.

Besides, an E-mail address, authority information and the like of the user are included. Incidentally, when the print job 920 is transferred, transmission setting is performed on a transmission setting screen 1500 (FIG. 13). Here, the information such as the user name, the password, a default sharing directory or the like to be input usually at this time may previously be set. By doing so, in a case where the user wishes to transmit the file to the user's own client PC 200, the above information included in the user information 910 is preset when the transmission setting screen 1500 is displayed, whereby the system which has high working efficiency can be achieved.

As illustrated in FIG. 14, the multifunction device setting 900 is the information for setting the operation of the multifunction device 100. More specifically, the multifunction device setting 900, which is stored in the HDD 3004 of the multifunction device 100, includes print server information 901, scan ticket server information 902, transmission server information 903, and the like.

The print server information 901 is the information for determining the print server 300 which the multifunction device 100 communicates. More specifically, an IP address, a port number and the like are set.

The scan ticket server information 902 is the information for determining the scan ticket server 400 with which the multifunction device 100 communicates. More specifically, an IP address, a port number and the like are set.

The transmission server information 903 is the information for determining the transmission server 500 with which the multifunction device 100 communicates. More specifically, an IP address, a port number and the like are set.

As illustrated in FIGS. 12 and 13, the screen which is suitable for a user's utilization purpose according to the status of user's utilization is provided on the operation unit 3030 of the multifunction device 100.

A login screen 1000 is the screen through which the user logs in the multifunction device 100 and on which the user performs the authentication using the IC card. This screen includes a transition button for moving to a keyboard authentication screen so that even a user who forgets the IC card can perform the authentication. The keyboard authentication screen moved from the login screen 1000 is the screen on which the user performs the authentication for the multifunction device 100 by inputting/selecting the user name, the password and the login destination. In addition, the login screen 1000 has a user information management function, a guest login function and the like.

A print job screen 1100 is the screen through which the user prints the print job 920. When the user logs in the multifunction device 100, the multifunction device 100 obtains the list of the print jobs 920 of the user from the print server 300 by using the user name as a key, and sets the list to this screen. Then, the user, who selects the print job 920 on this screen, can transfer the print job to another user, and directly print the print job 920. The print job screen 1100 includes a user name field 1101, a job list 1102, a transfer button 1103, a print button 1104, and the like.

The user name filed 1101 is the region in which the user name of the user who is currently logging in is displayed.

The job list 1102 is the region in which the list of the print jobs obtained from the print server 300 is displayed. Further, a job name, job input date and hour, a print setting, an instructor and the like are displayed in this list.

The transfer button 1103 is the button for transferring the own print job 920 of the user to another user. When this button is depressed, the screen moves to a print job transfer setting screen 1300 (FIG. 13).

The print button 1104 is the button for printing the own print job 920 of the user.

A scan ticket screen 1200 is the screen through which the user performs the scan of the original. When the user logs in the multifunction device 100, the multifunction device 100 obtains the list of the scan tickets 930 of the user from the scan ticket server 400 by using the user name as a key, and sets the list to this screen. Then, the user can select the scan ticket 930 on this screen, and perform the scan according to a predetermined condition. The scan ticket screen 1200 includes a user name field 1201, a scan ticket list 1202, a scan button 1203, and the like.

The user name filed 1201 is the region in which the user name of the user who is currently logging in is displayed.

The scan ticket list 1202 is the region in which the list of the scan tickets obtained from the scan ticket server 400 is displayed. Further, scan attributes such as a job name, color, double-sided setting, resolution, a file format and the like are displayed in this list.

The scan button 1203 is the button which is used when the user instructs to start the scan to the multifunction device 100.

The print job transfer setting screen 1300 is the screen through which the user transfers the own print job 920 to another user. The print job transfer setting screen 1300 includes a job name field 1301, a transfer destination user field 1302 (for designating a transfer-destination user), a scan transmission setting 1303, and the like.

The job name field 1301 is the region to which a name of the print job 920 after the transfer can be set. As the job name set to the print job 920, the file name of the file originally printed by the print-issued client PC 200 is set. For this reason, when the job name is displayed as it is for the print-instructed user, it is often difficult for the relevant user to understand the displayed job name. To prevent such inconvenience, in this field, the original job name can be changed to the name which can be easily understood for the relevant user.

The transfer destination user field 1302 is the region in which a partner to which the print job 920 is transferred is input. Here, this filed may be the text field in which the user can freely input the name, the filed in which the user obtains the list from the authentication information and can select the desired transfer destination user from the obtained list, or the field in which the user can select the desired transfer destination user from the previously prepared list. In any method, it only has to be able to set the information capable of specifying the transfer destination user.

The scan transmission setting 1303 is the setting for determining, after the transferred print job 920 was printed by the transfer destination user, whether or not to enable the transfer destination user to utilize the scan ticket. Incidentally, when this setting is not performed, only the print job is merely transferred. For example, this setting is not performed when the user wishes to cause the subordinate to print a manual or an order. On the other hand, this setting is performed when the user wishes to cause the transfer destination user to give the voucher or the seal to the document such as the transportation expense application, the written overtime work order or the like, scan the obtained document, and then return the scanned document.

When the OK button is depressed in the state that the scan transmission setting is "YES", the screen moves to a scan setting screen 1400. On the other hand, when the OK button is depressed in the state that the scan transmission setting is "NO", a print job transfer process starts, and the screen moves to the print job screen 1100.

The scan setting screen 1400 is the screen for setting the scan attribute. The information (read setting information) set here is set to the scan ticket 930. The scan setting screen 1400 includes a resolution selection button 1401, a color selection button 1402, a file format selection button 1403, and the like.

The resolution selection button 1401 is the button for selecting the resolution of the scan. For example, the resolution can be selected from "200×200", "300×300", and "600× 600".

The color selection button 1402 is the button for selecting the color of the scan. For example, the color of the scan can be selected from "MONOCHROME", "COLOR", and "AUTO".

The file format selection button 1403 is the button for selecting the file format of the scan. For example, the file format can be selected from "TIFF", "PDF" and "XPS".

Besides, it may be possible to adopt a constitution capable of inputting and selecting scan density, the number of scans, and the like.

The transmission setting screen 1500 is the screen through which the user performs the transmission setting. The information set here is set to the transmission ticket 940. The transmission setting screen 1500 includes a transmission destination field 1501, a user field 1502, a password field 1503, and the like.

The transmission destination field 1501 is the input filed for inputting the server directory of the transmission destination. For example, the sever directories may automatically be collected as a list as the result of the search in the network, and then the desired server directory may be selected from the list.

The user field 1502 is the field for inputting the user name to access the transmission destination server.

The password field 1503 is the field for inputting the password to access the transmission destination server.

Incidentally, these input fields may previously be set in the user information 910. In this case, they are preset when the transmission setting screen 1500 is displayed.

In addition, it may be possible to adopt a constitution capable of inputting and selecting an authentication domain, a transmission protocol, and the like.

Also, it may be possible to adopt a constitution that the transmission destination information is not set but fixed transmission setting is previously held on the side of the transmission server 500. In this case, the transmission setting screen 1500 has a constitution for selecting a document classification. Namely, the document classification selected here is tied to the transmission setting prepared on the side of the transmission server 500.

In the present embodiment, the authentication information management unit 102 and the authentication information storage unit 120 are prepared on the multifunction device 100. However, these units may be prepared respectively on different devices like the authentication server.

Subsequently, a process outline of the information processing system 1 will be described with reference to FIG. 5.

Figure 5:
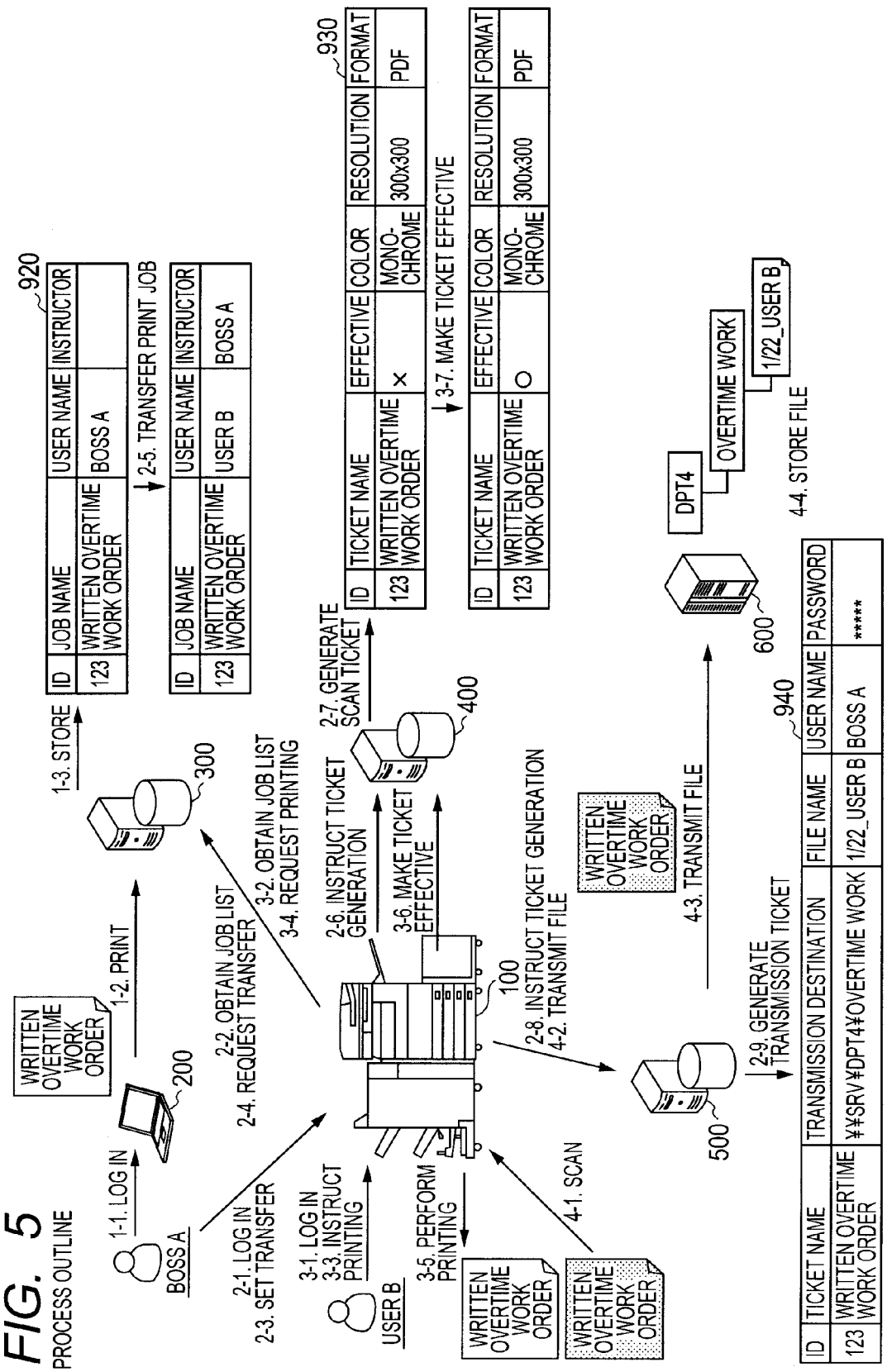
FIG. 5 is a diagram illustrating a process outline of a print process of the information processing system 1.

FIG. 5 is the diagram illustrating the process outline of the information processing system 1.

FIG. 5 shows the process outline which includes a process of inputting the print job, a process of transferring the input print job, a process of printing the transferred print job, and a process of performing the scan according to the scan ticket. Here, in the following, a case where the process of inputting the print job and the process of transferring the input print job are performed by the user who is the boss "BOSS A" and the process of printing the transferred print job and the process of performing the scan according to the scan ticket are performed by the user who is the subordinate "USER B" will be exemplified.

Initially, the outline of the process of inputting the print job will be described.

The client PC 200 accepts the login of the user (BOSS A) (1-1), generates the print job 920, and inputs it to the print server 300 (1-2). The print server 300 accepts the print job 920, and stores it therein (1-3).

Next, the outline of the process of transferring the input print job will be described.

The multifunction device 100 accepts the login according to the IC card held over by the user (BOSS A) or the user information (i.e., the user ID, the password, etc.) (2-1), and obtains the print job list of the logged-in user from the print server 300 (2-2). The multifunction device 100 accepts the transfer setting to the print job 920 selected from the print job list (2-3), and issues the transfer request to the print server 300 (2-4). The print server 300 sets the user name 923 to the instructor 924 of the stored print job 920, and sets the user name of the transfer destination to the user name 923 (2-5). The multifunction device 100 instructs the scan ticket server 400 to generate the ticket (2-6). The scan ticket server 400 generates the scan ticket 930 tied to the print job, on the basis of the instruction (2-7). Likewise, the multifunction device 100 instructs the file transmission server 500 to generate the ticket (2-8). The file transmission server 500 generates the transmission ticket 940 tied to the scan ticket 930, on the basis of the instruction (2-9).

Next, the outline of the process of printing the transferred print job will be described.

The multifunction device 100 accepts the login of the user (USER B) (3-1), and obtains the print job list of the logged-in user from the print server 300 (3-2). The multifunction device 100 accepts the print instruction to the print job 920 selected from the print job list (3-3), and issues the print request to the print server 300 (3-4). The print server 300 transmits the print job 920 to the multifunction device 100, and the multifunction device 100 outputs the accepted print job 920 (3-5). The multifunction device 100 instructs the scan ticket server 400 to make the ticket effective (3-6). Then, the scan ticket server 400 makes the instructed scan ticket 930 effective (3-7).

Incidentally, in the present embodiment, it is instructed in the steps 2-6 and 2-8 to generate the ticket when the transfer request is issued to the print server 300 in the step 2-4. However, the scan ticket server 400 may be instructed to generate the ticket in the steps 2-6 and 2-8 when the print request is issued to the print server 300 in the step 3-4. In this case, in the transfer request of the step 2-4, the scan setting information for generating the scan ticket 930 set on the screen 1300 or 1400 illustrated in FIG. 13 is transmitted to the print server 300. Then, the print server 300 stores the received scan setting information to the external memory 2011, in correspondence with the designated print job 920.

Further, in the case where the print request is issued to the print server 300 in the step 3-4, when the ticket is generated in the scan ticket server 400, the scan ticket generation instruction can be issued from the print server 300 to the scan ticket server 400, and also the transmission ticket generation instruction can be issued to the file transmission server 500.

That is, in the present embodiment, when the request for printing the print job such as the transfer request, the print request or the like is accepted from the multifunction device 100, the scan ticket is generated, and then processes in later-described step 4-1 and subsequent steps can be performed using the generated scan ticket.

Next, the outline of the process of performing the scan according to the scan ticket will be described.

The multifunction device 100 accepts the scan of the user (USER B) (4-1), and transmits the file generated by the scan to the file transmission server 500 (4-2). The file transmission server 500 transmits the file to the file server 600, on the basis of the content of the previously stored transmission ticket 940 (4-3). The file server 600 receives the file, and stores it with the designated file name in the designated directory (4-4).

Subsequently, the detailed processes of the information processing system 1 according to the present invention will be described with reference to FIGS. 6, 7, 8, 9, 10 and 11.

Here, it should be noted that characteristic processes in the present embodiment are processes in, for example, a step S301 or S303, a step S409, a step S414, a step S606, and a step S612.

Figure 6:
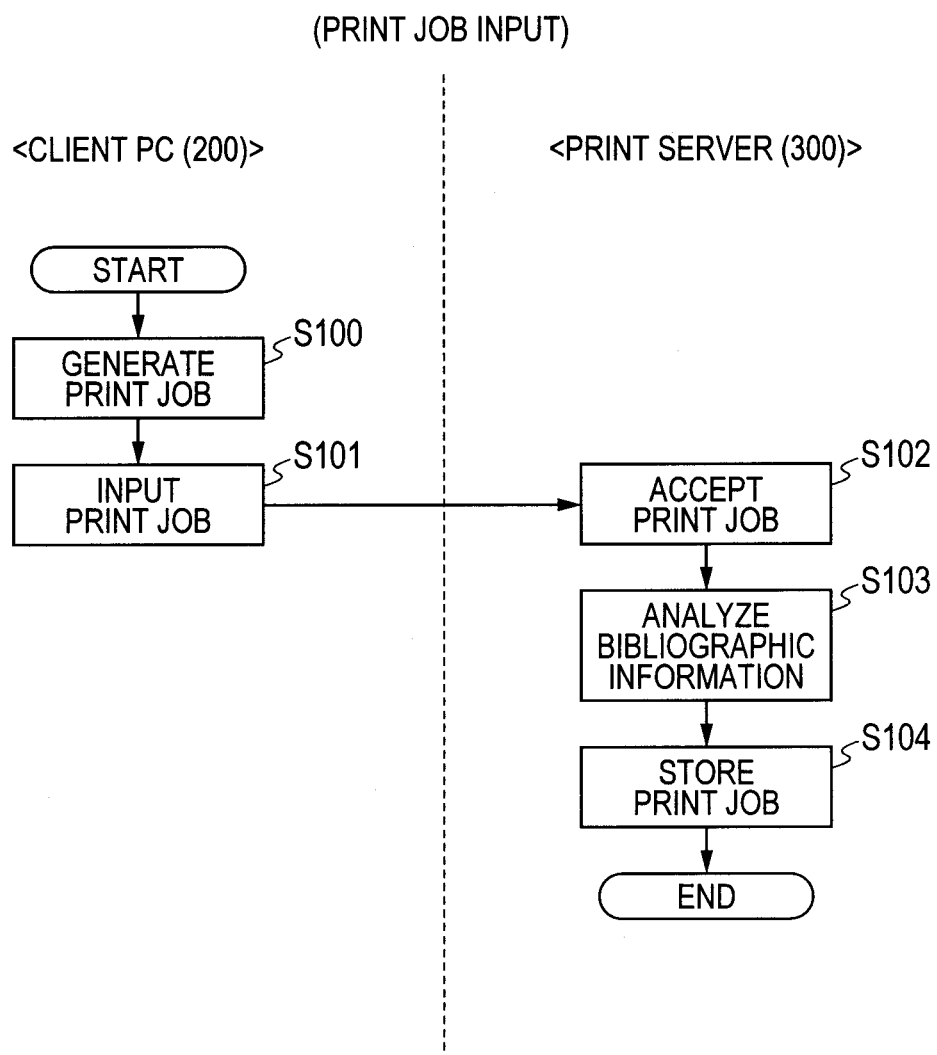
FIG. 6 is a flow chart indicating an example of a print job input process of the information processing system 1.
Figure 7:
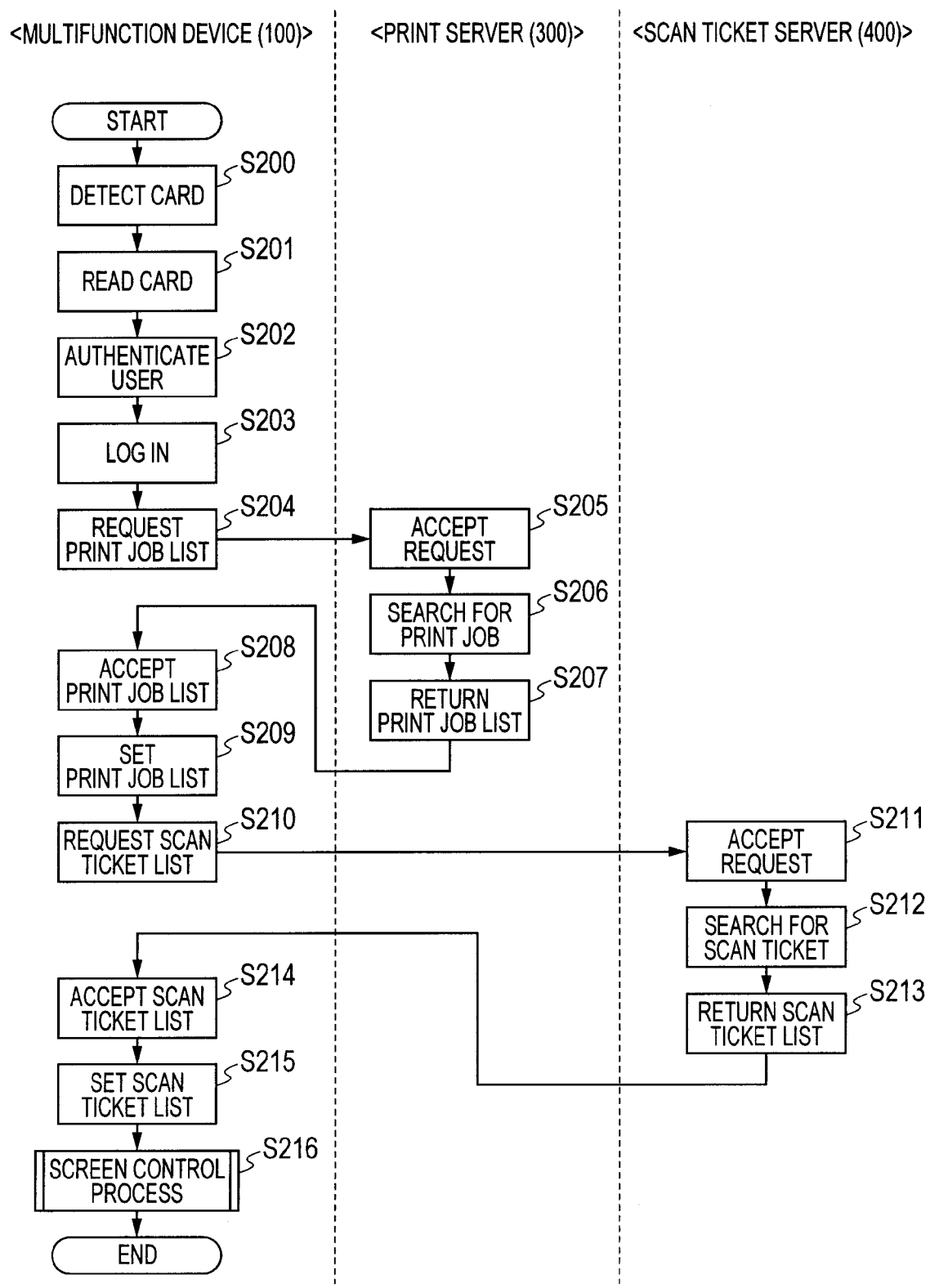
FIG. 7 is a flow chart indicating an example of a login process of the information processing system 1.
Figure 8:
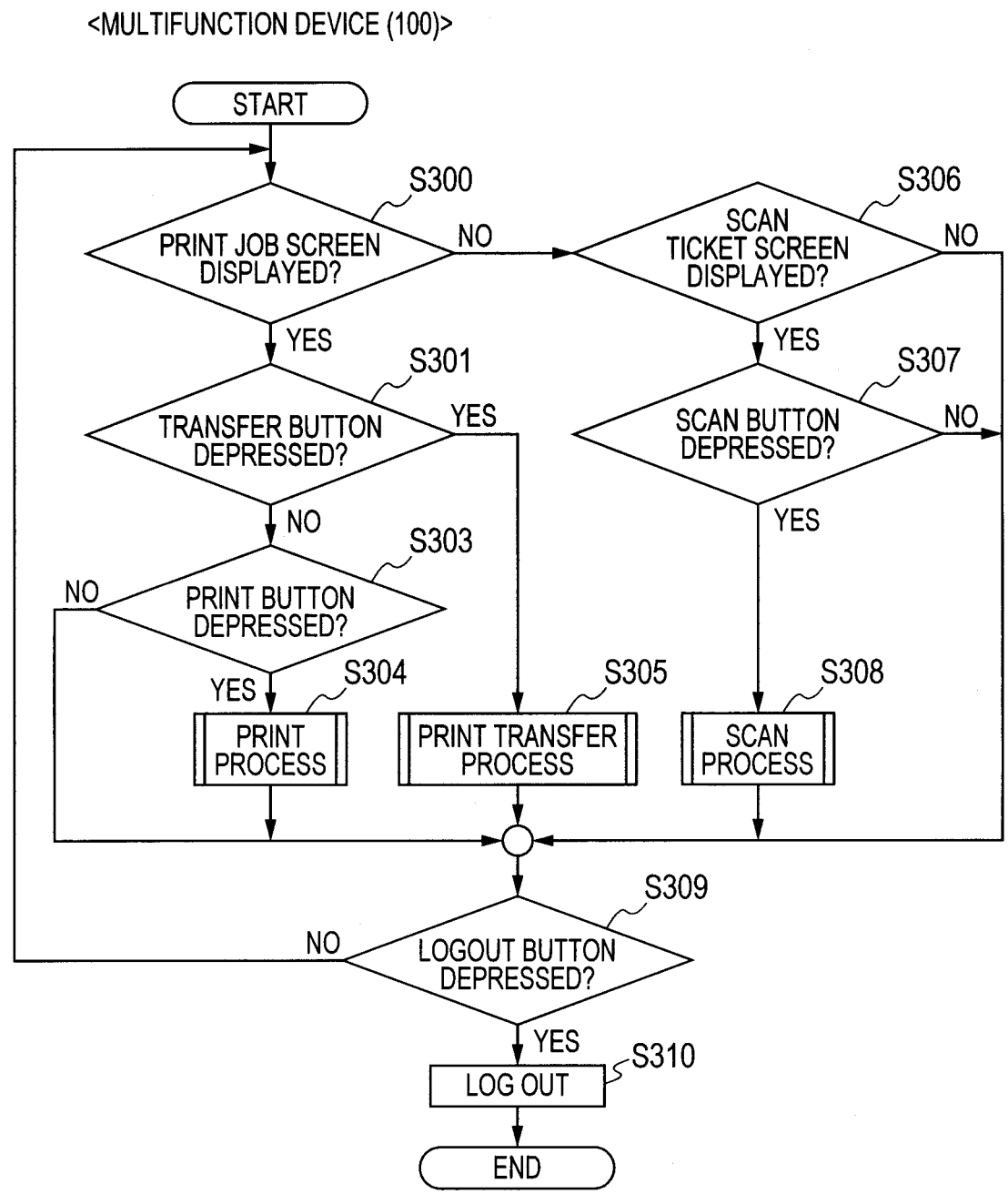
FIG. 8 is a flow chart indicating an example of a screen control process of the information processing system 1.
Figure 9:
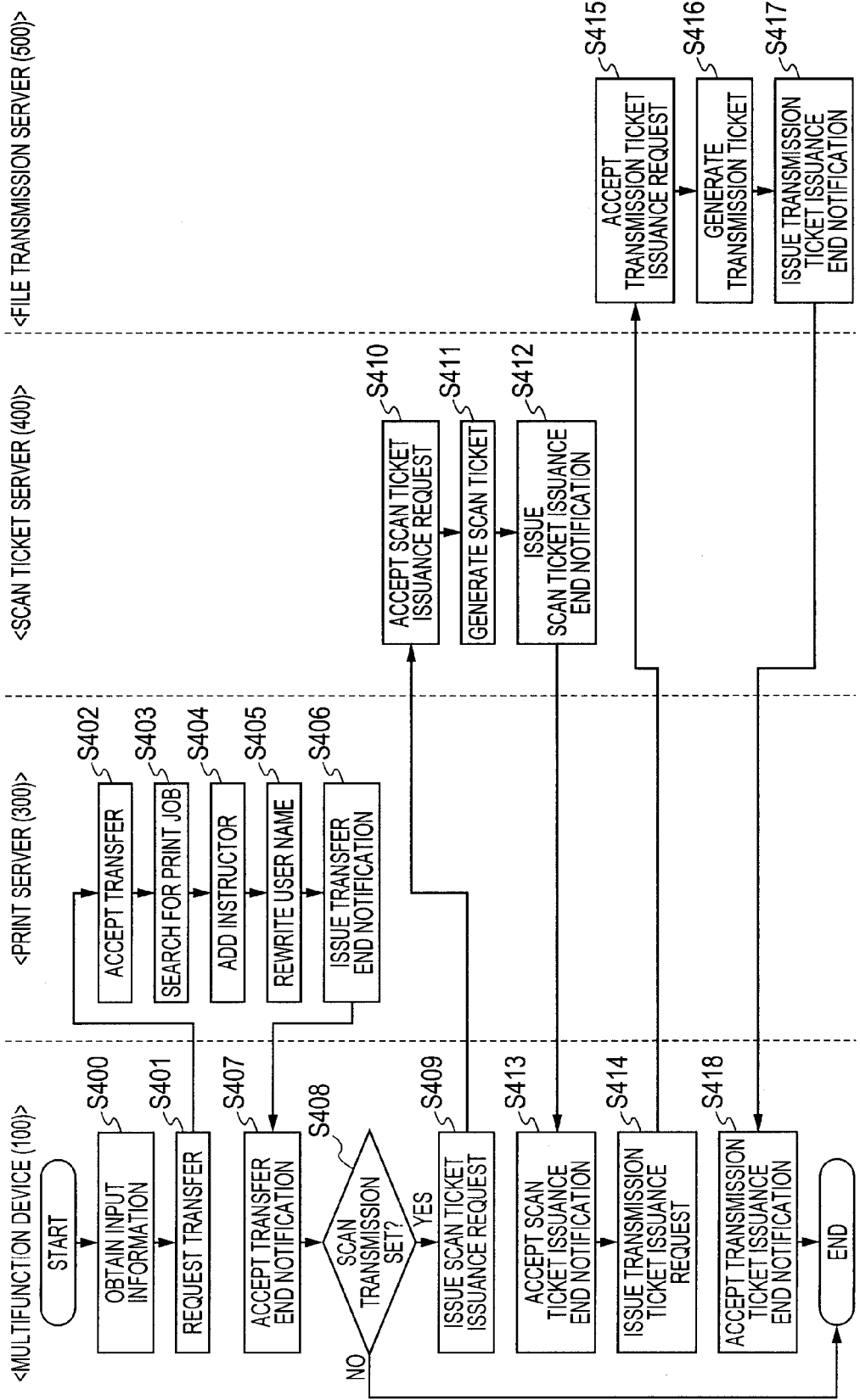
FIG. 9 is a flow chart indicating an example of a print job transfer process of the information processing system 1.
Figure 10:
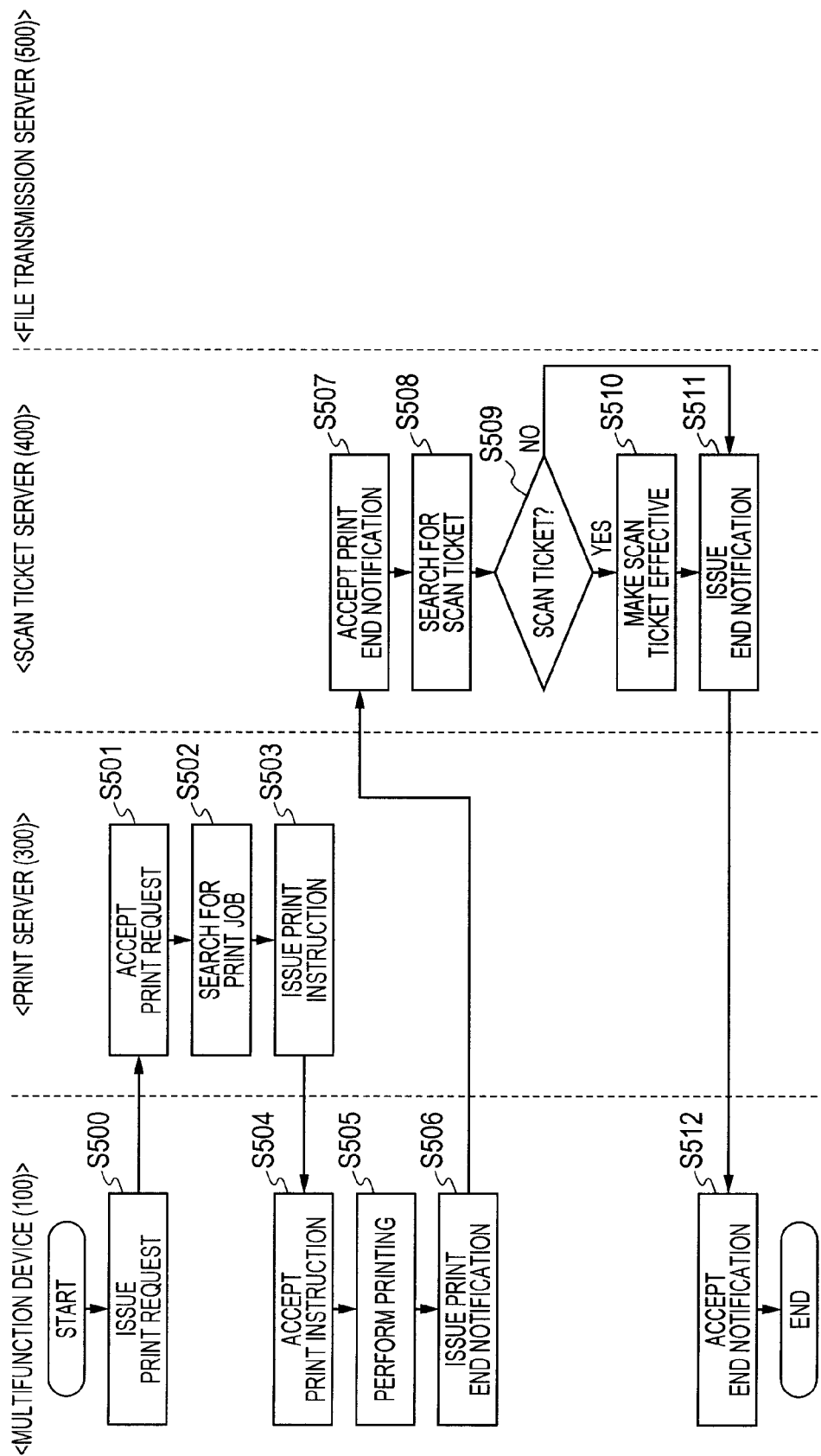
FIG. 10 is a flow chart indicating an example of a print process of the information processing system 1.
Figure 11:
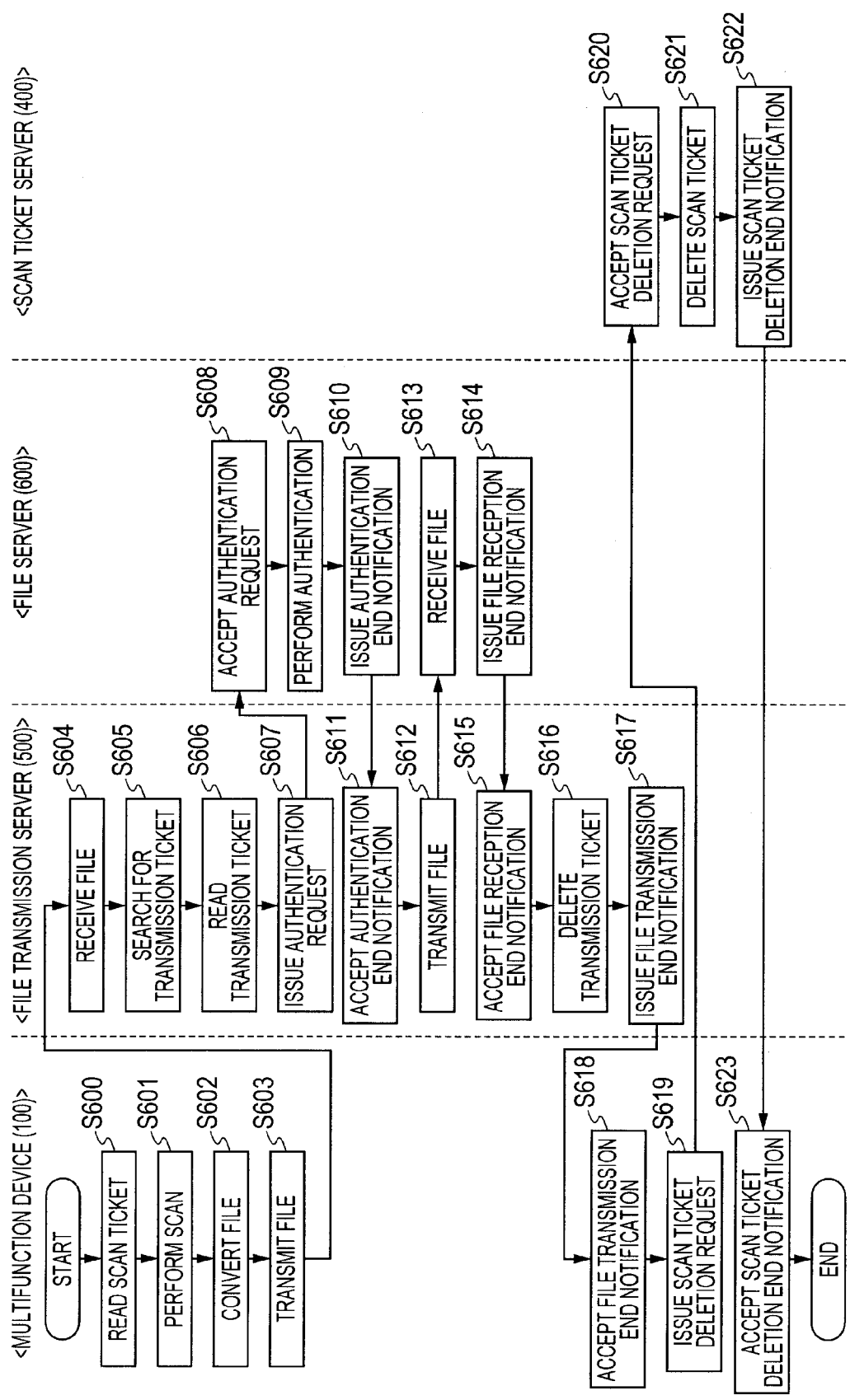
FIG. 11 is a flow chart indicating an example of a scan process of the information processing system 1.

FIG. 6 is the flow chart indicating an example of the print job input process of the information processing system 1, FIG. 7 is the flow chart indicating an example of the login process of the information processing system 1, FIG. 8 is the flow chart indicating an example of the screen control process of the information processing system 1, FIG. 9 is the flow chart indicating an example of the print job transfer process of the information processing system 1, FIG. 10 is the flow chart indicating an example of the print process of the information processing system 1, and FIG. 11 is the flow chart indicating an example of the scan process of the information processing system 1.

Initially, the print job input process of the information processing system 1 will be described with reference to FIG. 6.

In the process of FIG. 6, the client PC 200 generates the print job 920, and transmits the generated print job to the print server 300.

As illustrated in FIG. 6, the client PC 200 generates the print job 920 by using the printer driver (step S100), and transmits the generated print job to the print server 300 (step S101).

The print server 300 accepts the print job 920 (step S102), and analyzes the bibliographic information (step S103). More specifically, the print settings such as the job ID, the user name, the color, the number of prints and the like included in the bibliographic information are analyzed.

The print server 300 stores the print job 920 in the print job storage unit 310 (step S104).

Next, the login process of the information processing system 1 will be described with reference to FIG. 7.

In the process of FIG. 7, the multifunction device 100 accepts the login of the user.

As illustrated in FIG. 7, the multifunction device 100 detects the IC card of the user held over the card reader 3040 (step S200), and then reads the internal information such as the card ID and the like (step S201).

The multifunction device 100 detects, from the plural user information 910 stored in the authentication information management unit 102, the user information 910 having the card ID same as the card ID obtained in the previous step (step S202), and enables the user to log in the main body of the multifunction device by using the obtained user information 910 (step S203). More specifically, the user information 910 is internally held, and the login screen 1000 displayed on the operation unit 3030 is changed to the print job screen 1100 or the scan ticket screen 1200.

The multifunction device 100 issues the print job list request to the print server 300 (step S204). At this time, also the user name 912 included in the user information 910 is transmitted. Further, the multifunction device 100 determines the print server 300 of the transmission destination by using the print server information 910 of the multifunction device setting 900.

The print server 300 accepts the request from the multifunction device 100 (step S205), searches for the print job 920 of the corresponding user from the print job storage unit 310 by using the user name 912 as a key (step S206), generates the list of the print jobs 920, and returns the generated list to the multifunction device 100 (step S207). Incidentally, the list generated at this time is not the list which includes the print jobs 920 as they are, but the list which includes the print jobs 920 from which the PDLs 922 are omitted respectively because the PDL 922 is the substance of the print job 920 and thus the data size thereof is large. Namely, since the PDL is not transmitted to the multifunction device 100 when it is intended to only refer to the list itself such as a print list, it is possible to improve processing performance.

The multifunction device 100 accepts the list of the print jobs from the print server 300 (step S208), and sets it to the print job list 1102 of the print job screen 1100 (step S209).

Thus, the user can browse the own print reservation list which includes own reserved print jobs, and perform the print of the print job.

The multifunction device 100 issues the scan ticket list request to the scan ticket server 400 (step S210). At this time, also the user name 912 included in the user information 910 is transmitted. Further, the multifunction device 100 determines the scan ticket server 400 of the transmission destination by using the scan ticket server information 902 of the multifunction setting 900.

The scan ticket server accepts the request from the multifunction device 100 (step S211), searches for the scan ticket 930 of the corresponding user from the scan ticket storage unit 410 by using the user name 912 as a key (step S212), generates the list of the scan tickets 930, and returns the generated list to the multifunction device 100 (step S213). Incidentally, it is assumed that only the tickets each of which has the effective flag 933 of "TRUE" are stored in the list generated at this time.

The multifunction device 100 accepts the list of the scan tickets from the scan ticket server 400 (step S214), and sets it to the scan ticket list 1202 of the scan ticket screen 1200 (step S215).

Thus, the user can browse the own scan reservation list which includes own reserved scans, and actually perform the scan.

The multifunction device 100 performs the screen control process as illustrated in FIG. 8 (step S216).

Incidentally, although the IC card (target to be read) is used in the present embodiment, it is possible to adopt a constitution that biological information such as a fingerprint, a vein or the like (target to be read) is used when the user authentication is performed and the IC card is used when it is intended to give authority. In this case, it is assumed that a reader for reading the biological information is connected to the multifunction device 100.

Further, it is also possible to adopt a constitution that the screen for causing the user to input discrimination information such as a user name, a password and the like is used when the user authentication is performed. Incidentally, when the discrimination information is input, a software keyboard is displayed on the operation unit 3030 to enable the user to do so.

That is, as the information to be used for the user authentication, the discrimination information (the card ID, the biological information, the user name, and/or the password) for discriminating or identifying the user only has to be input.

Next, the screen control process of the information processing system 1 will be described with reference to FIG. 8.

In the process of FIG. 8, the multifunction device 100 discriminates the screen displayed on the operation unit 3030 and the button selected by the user on the displayed screen, and thus performs the process according to the selected button on the displayed screen. More specifically, the multifunction device 100 performs the respective processes according to the selected conditions on the print job list and the scan ticket list.

As illustrated in FIG. 8, the multifunction device 100 judges whether or not the screen displayed on the operation unit 3030 is the print job screen 1100 (step S300). When it is judged that the print job screen 1100 is displayed, the print job list accepted in the step S208 is displayed on the print job screen 1100. The designation of the print job to be transferred or printed on the print job list is accepted based on the user's operation. Here, the designation of the print job is to designate, from the print jobs accumulated in the print server, the print job to be processed.

Then, the multifunction device 100 judges whether or not the transfer button 1103 is depressed (step S301). In other words, the process in the step S301 is the process of judging whether or not an instruction concerning the printing is issued (instruction judgment).

When it is judged that the transfer button 1103 is not depressed, then the multifunction device 100 further judges whether or not the print button 1104 is depressed (step S303). When it is judged that the print button 1104 is depressed, the multifunction device 100 performs the print process illustrated in FIG. 10 (step S304).

As a result of the judgment in the step S301, when it is judged that the transfer button 1103 is depressed, the multifunction device 100 performs the print job transfer process illustrated in FIG. 9 (step S305).

As a result of the judgment in the step S300, when it is judged that the displayed screen is not the print job screen 1100, the multifunction device 100 further judges whether or not the screen displayed on the operation unit 3030 is the scan ticket screen 1200 (step S306). When it is judged that the scan ticket screen 1200 is displayed (step S307), the multifunction device 100 performs the scan process illustrated in FIG. 11 (step S308).

The multifunction device 100 judges whether or not a logout button (not illustrated) is depressed (step S309). When it is judged that the logout button is depressed, then the multifunction device 100 performs a logout process of the user (step S310). More specifically, the user information 910 held internally is discarded, and the login screen 1000 is displayed on the operation unit 3030.

Subsequently, the print job transfer process of the information processing system 1 will be described with reference to FIG. 9. Incidentally, the print job transfer process is the process which is called up when the print job is selected and then the transfer button 1103 is depressed on the print job screen 1100.

In the process of FIG. 9, the multifunction device 100 performs print job transfer, issues a scan ticket generation instruction, and issues a transmission ticket generation instruction, on the basis of the print job transfer setting input by the user.

As illustrated in FIG. 9, the multifunction device 100 obtains the information input to the screen by the user (step S400). More specifically, various information to be input and set on the print job transfer setting screen 1300, the scan setting screen 1400 and the transmission setting screen 1500 is obtained.

The multifunction device 100 issues the transfer request of the print job to the print server 300 (step S401). At this time, the user name 912 of the user who is currently logging in the multifunction device 100, the job ID 921 (discrimination information) of the selected print job, the value input in the job name field 1301, and the value input in the transfer destination user field 1302 are transferred (user output). Namely, the print job is directed to the print job of the user input in the transfer destination user field 1302 (i.e., the user who is different from the user who is currently logging in). Then, the issuance request (generation request) of the scan ticket corresponding to the print job given to the user being the transfer destination is issued in a later-described step S409.

The print server 300 accepts the transfer request from the multifunction device 100 (step S402), and searches for the relevant print job 920 from the print job storage unit 310 by using the job ID 921 as a key (step S403).

The print server 300 sets the user name 912 received from the multifunction device 100 to the instructor 924 of the searched print job 920 (step S404), and sets the value input in the transfer destination user field 1302 and received from the multifunction device 100 to the user name 923 of the print job 920 (step S405). Further, the print server 300 sets the value input in the job name field 1301 and received from the multifunction device 100 to the job name of the print job 920.

By the above processes, the print job 920 originally owned by the user oneself (called a first user) can be changed to the print job owned by another user (called a second user). Thus, when the second user logs in the multifunction device 100, the second user can display the print job transferred from the first user in the list as if the transferred print job is the print job owned by the second user, and then select and print the relevant print job.

The print server 300 notifies the multifunction device 100 that the transfer process ends, in the form of a transfer end notification (step S406).

The multifunction device 100 accepts the transfer end notification from the print server 300 (step S407), and judges whether or not the scan transmission setting has been performed (step S408). More specifically, it is judged whether or not the scan transmission setting 1303 on the print job transfer setting screen 1300 has been set to "YES". Incidentally, it is possible to have a constitution that the scan transmission setting is performed whenever the transfer is performed. Namely, in a case where the transfer setting is performed (that is, in a case where the instruction concerning the printing is issued), when it is judged that the instruction concerning the printing is issued to the designated print job, generation (issuance) of the scan ticket for performing the reading of the paper document on which the designated print job has been printed is requested in the later-described step S409.

As a result of the judgment in the step S408, when it is judged that the scan transmission setting 1303 has been set to "YES", the multifunction device 100 transmits the scan ticket issuance request to the scan ticket server 400 (step S409). At this time, the user name 912 in the user information 910 of the user who is currently logging in the multifunction device 100 is obtained and transmitted, and also the job ID 921 in the print job 920 selected on the print job screen 1100 is obtained and transmitted.

In addition, the conditions (reading settings) selected based on the resolution selection button 1401, the color selection button 1402 and the file format selection button 1403 of the scan setting screen 1400 are transmitted together.

The scan ticket server 400 accepts the scan ticket issuance request from the multifunction device 100 (step S410), and generates the scan ticket on the basis of the information received from the multifunction device 100 (step S411). More specifically, the job ID 921 is set to the ticket ID 931, whereby the print job 920 can be tied to the scan ticket 930. Further, the user name 912 is set to the user name 934, whereby the scan ticket list tied to the user who logged in can be obtained. Furthermore, the conditions of the respective selection buttons selected on the print job screen 1100 are set to the scan setting 932, whereby the user need not perform the setting when he/she performs the scan. Furthermore, "FALSE" is set to the effective flag 933 so as to disable the scan ticket until the print job is performed. For example, in the case where the boss transfers the print job of the written overtime work order to the subordinate, the boss wishes the subordinate to print the transferred written overtime work order, affix his/her seal to the printed written overtime work order, and scan the written overtime work order with the seal. Therefore, if the scannable state is set at the time when the print job is transferred, the scan can resultingly be performed before the print job is printed. Consequently, there is a possibility that the written overtime work order of the previous day is scanned, and there is a further possibility that another document is scanned. Namely, it is possible to reduce such operation errors by using the effective flag 933.

The scan ticket server 400 issues a scan ticket issuance end notification to the multifunction device 100 (step S412).

Incidentally, as described above with reference to FIG. 5, in the present embodiment, the scan ticket issuance request is issued according to the transfer request, and the scan ticket is generated. However, it is possible to have a constitution that the scan ticket issuance request is issued according to a print request (i.e., an instruction concerning printing) indicated in later-described FIG. 10.

In this case, in the step S401, the information obtained in the step S400 for generating the scan ticket is transmitted to the print server 300 so that the relevant information is tied to the selected print job and then managed. Further, in this case, it is constituted that the information (the resolution, the color, and the file format) for generating the scan ticket is included in the print job list accepted in the step S208. Namely, it is possible to have a constitution that, in a case where the print job is designated and the print instruction is issued to the designated print job in the step S303, when the print request is issued in a step S500, the scan ticket issuance request in the step S409 is transmitted to the scan ticket server.

The multifunction device 100 accepts the scan ticket issuance end notification from the scan ticket server 400 (step S413), and transmits a transmission ticket issuance request to the file transmission server 500 (step S414). At this time, the job ID 921 of the print job 920 selected on the print job screen 1100 is obtained and transmitted. Also, the input conditions (transmission destination setting) such as the transmission destination field 1501, the user field 1502 and the password field 1503 of the transmission setting screen 1500 are transmitted.

The file transmission server 500 accepts the transmission ticket issuance request from the multifunction device 100 (step S415), and generates the transmission ticket based on the information received from the multifunction device 100 (step S416). More specifically, the job ID 921 is set to the ticket ID 941, whereby the print job 920 can be tied to the transmission ticket 940. Also, the values of the respective fields input on the scan ticket screen 1200 are set to the transmission setting 942, whereby the user who performs the scan can actually perform the scan without regard to the transmission destination.

The file transmission server 500 issues a transmission ticket issuance end notification to the multifunction device 100 (step S417).

The multifunction device 100 accepts the transmission ticket issuance end notification from the file transmission server 500 (step S418).

As just described, since the scan setting and the transmission setting are separately stored respectively in the different servers, high security can be achieved. In other words, there is a case where the network in which the data of the scan ticket 930 flows is an external network, and there is a case where the number of times that the data flows in the network is large because the data transmission and reception occur whenever the scan ticket is referred. For these reasons, the scan setting of which confidentiality is low and the transmission setting of which confidentiality is high are divided (or separated), and the divided settings are managed respectively by the different servers, thereby achieving high security.

As for the above former case, the scan ticket server 400 is often disposed operationally together with the file server 600 which manages the document files. Further, in a large company which has group companies and/or subsidiary companies and/or administers a large number of sales bases, since the file server 600 which manages the document files is generally shared by these companies and bases, this server is often concentrated on one base such as an administrative headquarter or the like. Consequently, from the viewpoint of a base other than the subsidiary companies, the group companies and the central office, the scan ticket server 400 does not exist in the LAN but exists in the network of the central office having the administrative headquarter. That is, when the user accesses the scan ticket server 400 from the multifunction device 100, he/she has to once connect with the network of the central office through an external network such as a WAN or the like and then access the scan ticket server. In this case, since there is a risk that data is wiretapped by a third party when it is transferred through the WAN, the company does not wish to transfer or transmit confidential data such as a password or the like on the WAN. Consequently, when the file transmission server 500 is constructed in each of the bases and the confidential information such as the user name, the password and the like to be transmitted are stored as the transmission ticket 940 in the file transmission server 500, it is possible to avoid transmitting confidential information through the WAN.

As for the above latter case, as illustrated in the flow chart of FIG. 7 concerning the login process, the multifunction device 100 accesses the scan ticket server 400 and obtains the list of the scan tickets 930 to be processed by the user whenever the user logs in the multifunction device 100. In other words, the information of the scan ticket 930 which may not resultingly be used flows on the network whenever the user logs in. On the other hand, the information of the transmission ticket 940 flows on the network only once at the time when the print job 920 is transferred from the multifunction device 100. Consequently, when the confidential information such as the password and the like is managed not in the scan ticket 930 but separately in the transmission ticket 940, it is possible to reduce the number of times that the confidential information flows on the network, whereby it is possible to reduce the risk of leak of the confidential information.

Incidentally, although the scan ticket and the transmission ticket are generated in response to the instructions of the multifunction device 100 in the present embodiment, these tickets may be generated in response to instructions of the print server 300, instead of the multifunction device 100. In any case, any problem does not occur if these tickets are generated at the timing when the print job is transferred or the print request of the print job is issued in the multifunction device 100. In other words, the scan ticket and the transmission ticket may be generated when it causes another user to print the print job or when the user to which the print job is transferred issues the print request to the transferred print job (that is, when the instruction concerning the print is issued to the print job).

Subsequently, the print process to be performed in the information processing system 1 will be described with reference to FIG. 10. Incidentally, the print process is the process which is called up when the print job is selected and then the print button 1104 is depressed on the print job screen 1100.

In the process of FIG. 10, the multifunction device 100 performs the print process for the selected print job, and further makes the scan ticket 930 effective when the print process ends.

As illustrated in FIG. 10, the multifunction device 100 issues a print request of the print job 920 selected on the print job screen 1100, to the print server 300 (step S500). At this time, the job ID 921 of the selected print job 920 is transmitted.

The print server 300 accepts the print request from the multifunction device 100 (step S501), and searches for, in the print job storage unit 310, the print job 920 coincident with the job ID 921 transmitted from the multifunction device 100 (step S502). Incidentally, as described above, the information which has been held on the print job screen 1100 by the multifunction device 100 is the information which does not include the PDL 922 of the print job 920. Therefore, the process of obtaining the PDL 922 being the substance of the print job from the print server 300 is performed for the print process.

The print server 300 transmits the searched print job 920 to the multifunction device 100 by using the print protocol such as the LPR (Line PRinter daemon) or the like (step S503).

The multifunction device 100 accepts the print job 920 from the print server 300 (step S504), analyzes the PDL 922, generates the image data based on the analyzed result, and then prints the generated image data on a medium such as a paper or the like with known print technique (step S505).

When the print process ends, the multifunction device 100 issues a print end notification to the scan ticket server 400 (step S506). At this time, the job ID 921 of the print job 920 is transmitted.

The scan ticket server 400 accepts the print end notification from the multifunction device 400 (step S507), and searches for, in the scan ticket storage unit 410, the scan ticket 930 which has the ticket ID 931 coincident with the accepted job ID 921 (step S508).

As a result of the search in the step S508, when the coincident scan ticket is found in the scan ticket storage unit 410 (step S509), the scan ticket server 400 sets the effective flag 933 of the corresponding scan ticket 930 to "TRUE" (step S510). Thus, the scan ticket 930 is made effective, whereby the user can refer to this scan ticket.

On the other hand, as a result of the search in the step S508, when the coincident scan ticket is not found in the scan ticket storage unit 410 (step S509), or when the scan ticket is found and the process of making the scan ticket effective is performed, the scan ticket server 400 issues an end notification to the multifunction device 100 (step S511). Incidentally, as the case where the coincident scan ticket is not found, there is a case where the scan ticket 930 is not tied to the print job 920. Namely, this corresponds to a case where the print job 920 which is not transferred to another use is directly printed as it is by the user oneself.

The multifunction device 100 accepts the end notification from the scan ticket server 400 (step S512).

Incidentally, it is possible to have a constitution that, when the scan ticket 930 is found in the search of the step S508, the multifunction device 100 is notified that the scan ticket is found, and the screen to be displayed on the operation unit 3030 is changed from the print job screen 1100 to the scan ticket screen 1200. Thus, for example, the user can put his/her signature and affix his/her seal to the paper immediately after it was printed, and at once scan the obtained paper without operating the screen. Consequently, the system of which convenience for the user is high can be achieved.

Subsequently, the scan process to be performed in the information processing system 1 will be described with reference to FIG. 11. Incidentally, the scan process is the process which is called up when the scan ticket is selected and then the scan button 1203 is depressed on the scan ticket screen 1200.

In the process illustrated in FIG. 11, the multifunction device 100 performs the scan based on the selected scan ticket, and transmits the obtained data to the file transmission server 500. Then, the file transmission server 500 transmits the received data to the file server 600 based on the transmission ticket.

As illustrated in FIG. 11, the multifunction device 100 displays the list of the scan tickets obtained from the scan ticket server 400 (display control), accepts the selection of the scan ticket on the scan ticket screen 1200 (user operation acceptance), reads the selected scan ticket 930 (step S600), performs the scan (reading) according to the scan setting 932 (step S601), performs the conversion to obtain the file format designated by the scan setting 932 (step S602), and then transmits the generated data to the file transmission server 500 (step S603). At this time, the ticket ID 931 of the selected scan ticket 930 is transmitted. Thus, the file (image) can be transmitted to the file server 600.

As just described, the scan is performed according to the scan setting 932 which has previously been set by the scan instructor (print transfer person), whereby the user who is instructed to perform the scan can generate a file of a necessary attribute and a necessary format only by setting an original and depressing the start button, without regard to the scan setting. Thus, convenience for the user highly improves, and erroneous scan setting by the user can be prevented, whereby efficiency improves.

The file transmission server 500 receives the file from the multifunction device 100 (step S604). Further, the file transmission server 500 searches for the transmission ticket 940, which is coincident with the ticket ID 931 received from the multifunction device 100, in the transmission ticket storage unit 510 (step S605), and reads the transmission setting 942 such as the user name, the password and the like of the transmission ticket 940 (step S606).

The file transmission server 500 issues an authentication request to the file server 600 on the basis of the transmission setting (step S607). More specifically, the authentication request is issued to the file server 600 by using the authentication protocol such as the Kerberos, the NTLM or the like, by using the account information such as the user name, the password and the like of the transmission ticket 940.

The file server 600 accepts the authentication request from the file transmission server 500 (step S608), and performs the authentication of the account (step S609). Then, when the authentication succeeds, the file server 600 issues an authentication end notification to the file transmission server 500 (step S610). At this time, also an authentication token or the like is issued.

The file transmission server 500 accepts the authentication end notification from the file server 600 (step S611), and transmits the file received in the previous step to the file server 600 by using the file transfer/file sharing protocol such as the FTP, the SMB, the WebDAV or the like (step S612).

The file server 600 receives the file from the file transmission server 500 (step S613), and stores the received file with the designated file name to the designated directory. When the file reception ends, the file server 600 issues a file reception end notification to the file transmission server 500 (step S614).

The file transmission server 500 accepts the file reception end notification from the file server 600 (step S615), deletes the used transmission ticket 940 from the transmission ticket storage unit 510 (step S616), and issues a file transmission end notification to the multifunction device 100 (step S617).

The multifunction device 100 accepts the file transmission end notification from the file transmission server 500 (step S618), and issues a scan ticket deletion request to the scan ticket server 400 (step S619). At this time, the ticket ID 931 of the scan ticket used in the previous step is transmitted.

The scan ticket server 400 accepts the scan ticket deletion request from the multifunction device 100 (step S620), deletes from the scan ticket storage unit 410 the scan ticket 930 which is coincident with the received ticket ID 931 (step S621), and issues a scan ticket deletion end notification to the multifunction device 100 (step S622).

The multifunction device 100 accepts the scan ticket deletion end notification from the scan ticket server 400 (step S623).

In the above process flow, the file server 600 receives the data from the file transmission server 500. However, the client PC 200, instead of the file server 600, may receive the data.

For example, when the boss wishes the subordinate to transmit the scan data to the PC of the boss oneself, the client PC 200, instead of the file server 600, receives the data. In this case, the path of the sharing folder of the client PC 200 or the like is designated as the transmission destination 1501 on the transmission setting screen 1500 illustrated in FIG. 13.

In the present embodiment, the account information such as the user name, the password and the like is set by the print job transfer instructor, and this information is stored as the transmission ticket 940 in the file transmission server 500. However, it is possible to have a constitution that the user name, the password and the like are not set to the transmission ticket 940.

For example, when the destination to which the scanned document is stored is fixed in the business work flow, a constitution that fixed account information and a transmission document classification are previously set in the file transmission server 500 and then only the transmission document classification is set to the transmission ticket 940 is conceivable.

More specifically, there is an operation that, when the boss issues an overtime work order to the subordinate, he/she makes a written overtime work order and stores it to a predetermined directory of a personnel work flow with a predetermined name. At this time, the boss once prints the written overtime work order, and transfers a print job to the subordinate on the multifunction device 100. Here, it is assumed that, when the print job is transferred, the setting is performed only to the document classification, i.e., the written overtime work order. Then, when the subordinate logs in the multifunction device 100, the print job of the written overtime work order is displayed. This print job transferred is printed by the subordinate, and the scan ticket is made effective at that point in time. Therefore, after the printing, the subordinate puts his/her signature and affixes his/her seal to the written overtime work order, and scans it. At this time, the file is transmitted from the multifunction device 100 to the file transmission server 500. Then, the file transmission server 500 logs in the personnel work flow with a previously set fixed account, from the document classification being the written overtime work order, and stores the document with a predetermined file name to the predetermined directory.

As just described, since the fixed account of the work flow is previously set in the file transmission server 500, the boss can omit to input the user name and the password when he/she transfers the print job, whereby the system of higher working efficiency can be achieved. Moreover, since the user name and the password are not transmitted from the multifunction device 100 to the file transmission server 500, the system of higher security can be achieved.

Incidentally, in the present embodiment, the transfer setting of the print job is performed on the multifunction device 100, and the ticket is generated when the transfer instruction of the print job is issued. Alternatively, the ticket is generated when the print instruction to the print job to which the transfer setting is performed is issued by the user on the multifunction device 100. However, it is also possible to have a constitution that a print application including a printer driver function is stored in the client PC 200, the user intended to print the print job by the relevant print application is selected, and the scan setting for scanning a printed matter obtained by the relevant print job is performed by the relevant print application, thereby generating the ticket without transferring the print job by the multifunction device 100.

More specifically, in the print application, the print job is accepted as well as the printer driver. Here, the setting screen same as the print job transfer setting screen 1300 illustrated in FIG. 13 is displayed on the CRT 2010 of the client PC 200, and an input of the user intended to print the accepted print job is accepted in the transfer destination user field 1302. Further, the setting screen same as the scan setting screen 1400 is displayed, and an input of the scan setting information for generating the scan ticket is accepted. Furthermore, the setting screen same as the transmission setting screen 1500 is displayed for setting the storage destination and the like of the image file when the scan is performed using the scan ticket, and inputs of the transmission destination, the user name, the password and the like are accepted. Incidentally, also a change of the print setting is accepted in the print application.

Next, the print application transmits, as the bibliographic information, the print job which includes the print settings such as the job ID, the user name, the color, the number of prints and the like, and the setting information (including the scan setting information) set on the setting screens 1300 to 1500, to the print server 300 of the previously set output destination.

When the print job is received, the print sever 300 extracts the bibliographic information to manage the print job.

When the print request is issued from the multifunction device 100 to the relevant print job having the scan setting information in response to the instruction of the user who can perform the printing, the scan setting information is transmitted from the multifunction device 100 or the print server 300 to the scan ticket server 400, and the scan ticket generation instruction is issued. Then, the scan ticket illustrated in FIG. 17 is generated in response to the relevant scan ticket generation instruction.

Incidentally, in this case, it is possible to have a constitution that the function of the file transmission server 500 is included in the scan ticket server 400, the transmission setting (the transmission destination, the user name, the password and the like set on the setting screen 1500) is transmitted to the scan ticket server 400, and the transmission ticket generation instruction is issued.

After then, the scan using the scan ticket is performed according to the flow chart illustrated in FIG. 11, whereby the file transmission is performed.

Namely, when the instruction concerning the printing is issued by the multifunction device 100 to the print job accumulated in the print server 300, the scan ticket is generated, whereby the original described on the paper document of the accumulated print job can easily be scanned, and the scanned data can easily be stored.

Further, although the print jobs are accumulated in the print server in the present embodiment, it is possible to have a constitution that the print jobs are accumulated in the HDD 3004 of the multifunction device 100.

In this case, when the instruction concerning the printing is issued by the multifunction device 100 to the print job accumulated in the multifunction device 100, the scan ticket is generated, whereby the original described on the paper document of the accumulated print job can easily be scanned, and the scanned data can easily be stored.

As just described in the present embodiment, in order to cause another user to perform the reading, the reading setting information in case of performing the reading of the paper document and the transmission setting information including the authentication information of the transmission destination to which the image of the paper document read by the reading is transmitted are transmitted respectively to the different servers to generate the scan ticket and the transmission ticket, whereby the image obtained by the reading using the scan ticket can be transmitted in view of security.

In addition, when the instruction concerning the printing is issued to the print job, the scan ticket is generated, whereby the scan process of the paper document of the print job to which the instruction concerning the printing is issued can easily be performed.

For example, when the print job is transferred to another person, or when the print instruction is issued to the print job transferred from another person, the scan ticket is generated, whereby a sequence of works from the print request to the scan can be made effective.

In particular, the boss previously stores the print job of the document to be submitted, in the print server or the multifunction device. Then, when the boss transfers the print job to the subordinate intended to print the print job or the subordinate prints the print job, the scan ticket is generated. Thus, it is possible to cause the subordinate to scan the document to be submitted and then actually submit it using the generated scan ticket, whereby efficient work can be achieved.

Incidentally, it should be noted that the data constitutions and their contents are not limited to those described in the present embodiment. Namely, it is needless to say that various data constitutions and their contents are applicable according to intended purposes and objects.

As above, the embodiment of the present invention has been explained. Besides, the present invention can adopt an embodiment as, for example, a system, an apparatus, a method, a program, a storage medium or the like. More specifically, the present invention may be applied to a system which consists of plural devices, or to an apparatus which comprises a single device.

Moreover, the program according to the present invention is the programs by which the computer can perform the processing methods shown by the flow charts illustrated in FIGS. 6 to 11, and the storage medium according to the present invention stores therein the programs by which the computer can perform the processing methods shown by the flow charts illustrated in FIGS. 6 to 11. Incidentally, the program according to the present invention may be the program for the processing method shown by each of the flow charts illustrated in FIGS. 6 to 11.

As described above, it is needless to say that the object of the present invention can be achieved in a case where the storage medium storing the programs to achieve the functions of the above embodiment is supplied to a system or an apparatus and then a computer (or CPU or MPU) in the system or the apparatus reads and performs the programs stored in the storage medium.

In this case, the programs themselves read from the storage medium achieve the new functions of the present invention, whereby the storage medium storing the programs constitutes the present invention.

As the storage medium for supplying the programs, for example, a flexible disk, a hard disk, an optical disk, a magnetooptical disk, a CR-ROM, a CD-R, a DVD-ROM, a magnetic tape, a nonvolatile memory card, a ROM, an EEPROM, a silicon disk, a slid-state drive, or the like can be used.

Further, it is needless to say that the present invention includes not only a case where the functions of the above embodiment are achieved by performing the programs read by the computer, but also a case where an OS (operating system) or the like running on the computer performs a part or all of the actual process according to instructions of the programs, whereby the functions of the above embodiment are achieved by that process.

Furthermore, it is needless to say that the present invention also includes a case where the programs read from the storage medium are once written in a memory provided in a function expansion board inserted in the computer or a function expansion unit connected to the computer, a CPU or the like provided in the function expansion board or the function expansion unit then performs a part or all of the actual process according to the instructions of the programs, and the functions of the above embodiment are achieved by the process.

Furthermore, the present invention may be applied to a system which consists of plural devices, or to an apparatus which comprises a single device. Furthermore, it is needless to say that the present invention can be applied to a case where the functions of the embodiment are achieved by supplying programs to a system or an apparatus. In this case, the storage medium of storing therein the programs to achieve the present invention is read to the system or the apparatus, whereby the system or the apparatus can have the effect of the present invention.

Furthermore, the programs for achieving the present invention are downloaded and read from a server on a network, a database or the like by means of a communication program, whereby the system or the apparatus can have the effect of the present invention.

Incidentally, it should be noted that the constitutions obtained by properly combining the above embodiment and various modifications thereof are all included in the present invention.

For example, in a case where a browser is installed and a screen based thereon is displayed on the multifunction device, the displayed screen may have a form of obtaining display information (e.g., file of HTML (Hyper Text Markup Language) format) generated by the print server or the scan ticket server of the present invention and displaying the obtained information by the browser of the multifunction device (e.g., cloud computing environment). In this case, the process to be performed by the multifunction device described in the embodiment can generate a script capable of being processed by the browser of the multifunction device in various servers, transmitting the display information including the generated script to the browser of the multifunction device, and displaying the transmitted display information by the browser, so that the process can be performed on the multifunction device according to user's operations.

While the present invention has been described with reference to the exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-113728, filed May 17, 2010, Japanese Patent Application No. 2010-113729, filed May 17, 2010, Japanese Patent Application No. 2010-256700, filed Nov. 17, 2010, and Japanese Patent Application No. 2010-256701, filed Nov. 17, 2010, which are hereby incorporated by reference herein in their entirety.

What is claimed is:

1. An image forming apparatus which can communicate with a management server for managing a scan ticket in which an instruction content for performing reading of a paper document is defined, and can issue an instruction concerning printing in regard to an accumulated print job, the image forming apparatus comprising:
   a designation unit constructed to designate, from a list of accumulated print jobs, a print job to be processed;
   an instruction judgment unit constructed to judge whether or not the instruction concerning the printing is issued to the print job designated by the designation unit;
   a generation request unit constructed to, according to a judgment by the instruction judgment unit that the instruction concerning the printing is issued to the designated print job, issue a generation request of the scan ticket including read setting for performing the reading of the paper document on which the print job has been printed, to the management server;
   a display control unit constructed to display a list of scan tickets obtained from the management server;
   a user operation accepting unit constructed to accept selection of a scan ticket from list information of the scan tickets displayed on a display unit by the display control unit; and
   a transmission unit constructed to perform the reading of the paper document using the scan ticket accepted by the user operation accepting unit, and transmit an image obtained by the reading to a transmission destination specified by the scan ticket,
   wherein the instruction judgment unit judges whether or not a print instruction is issued, and
   the image forming apparatus further comprises a discrimination information transmission unit constructed to, in a case where it is judged that the print instruction is issued, transmit discrimination information capable of specifying the scan ticket to the management server, so as to be able to use the scan ticket corresponding to the designated print job.

2. The image forming apparatus according to claim 1, further comprising a read setting unit constructed to, in the case where it is judged by the instruction judgment unit that the instruction concerning the printing is issued to the designated print job, perform the read setting for performing the reading of the paper document on which the print job has been printed,
   wherein the generation request unit issues the generation request of the scan ticket including the read setting set by the read setting unit.

3. The image forming apparatus according to claim 2, further comprising a transmission destination setting unit constructed to set the transmission destination to which the image obtained by the reading is transmitted,
   wherein the generation request unit issues the generation request of the scan ticket further including the transmission destination set by the transmission destination setting unit.

4. The image forming apparatus according to claim 1, further comprising a login unit constructed to log in the image forming apparatus, wherein the scan ticket to which the generation request is issued by the generation request unit is the scan ticket of the print job given according to an instruction from a user different from a user who logged in the image forming apparatus by the login unit.

5. The image forming apparatus according to claim 1, wherein
the instruction judgment unit judges whether or not a transfer instruction is issued, and
the image forming apparatus further comprises
a transfer user designation unit constructed to, in a case where it is judged that the transfer instruction is issued, designate a user to which the designated print job is transferred, and
a user output unit constructed to output the user to which the print job is transferred, so as to enable the user designated by the transfer user designation unit to print the designated print job.

6. An image processing system which includes a management server for managing a scan ticket in which an instruction content for performing reading of a paper document is defined, and an image forming apparatus capable of issuing an instruction concerning printing in regard to an accumulated print job, wherein
the image forming apparatus comprises:
a designation unit constructed to designate, from a list of accumulated print jobs, a print job to be processed;
an instruction judgment unit constructed to judge whether or not the instruction concerning the printing is issued to the print job designated by the designation unit;
a generation request unit constructed to, according to a judgment by the instruction judgment unit that the instruction concerning the printing is issued to the designated print job, issue a generation request of the scan ticket for performing the reading of the paper document on which the print job has been printed, to the management server;
a display control unit constructed to display list information of scan tickets obtained from the management server;
a user operation accepting unit constructed to accept selection of a scan ticket from the list information of the scan tickets displayed on a display unit by the display control unit; and
a transmission unit constructed to perform the reading of the paper document using the scan ticket accepted by the user operation accepting unit, and transmit an image obtained by the reading to a transmission destination specified by the scan ticket,
wherein the instruction judgment unit judges whether or not a print instruction is issued, and
the image forming apparatus further comprises a discrimination information transmission unit constructed to, in a case where it is judged that the print instruction is issued, transmit discrimination information capable of specifying the scan ticket to the management server, so as to be able to use the scan ticket corresponding to the designated print job, and
the management server comprises:
a generation unit constructed to generate the scan ticket for performing the reading of the paper document on which the print job has been printed, according to the generation request of the scan ticket from the image forming apparatus; and
a list information transmission unit constructed to transmit the list information of the scan tickets to the image forming apparatus.

7. A processing method performed by an image forming apparatus which can communicate with a management server for managing a scan ticket in which an instruction content for performing reading of a paper document is defined, and can issue an instruction concerning printing in regard to an accumulated print job, wherein
the image forming apparatus performs the steps of:
designating, from accumulated print jobs, a print job to be processed;
judging whether or not the instruction concerning the printing is issued to the designated print job;
according to a judgment in the judging step that the instruction concerning the printing is issued to the designated print job, issuing a generation request of the scan ticket for performing the reading of the paper document on which the print job has been printed, to the management server;
displaying a list of scan tickets obtained from the management server;
accepting selection of a scan ticket from list information of the scan tickets displayed on a display unit; and
performing the reading of the paper document using the accepted scan ticket, and transmitting an image obtained by the reading to a transmission destination specified by the scan ticket,
wherein the judging step judges whether or not a print instruction is issued, and
the image forming apparatus further comprises a discrimination information transmission step of, in a case where it is judged that the print instruction is issued, transmitting discrimination information capable of specifying the scan ticket to the management server, so as to be able to use the scan ticket corresponding to the designated print job.

8. A non-transitory computer-readable storage medium storing computer executable code of a computer program to cause an image forming apparatus, which can communicate with a management server for managing a scan ticket in which an instruction content for performing reading of a paper document is defined and which can issue an instruction concerning printing in regard to an accumulated print job, to perform following steps of:
designating, from accumulated print jobs, a print job to be processed;
judging whether or not the instruction concerning the printing is issued to the designated print job;
according to a judgment in the judging step that the instruction concerning the printing is issued to the designated print job, issuing a generation request of the scan ticket for performing the reading of the paper document on which the print job has been printed, to the management server;
displaying a list of scan tickets obtained from the management server;
accepting selection of a scan ticket from list information of the scan tickets displayed on a display unit; and
performing the reading of the paper document using the accepted scan ticket, and transmitting an image obtained by the reading to a transmission destination specified by the scan ticket,
wherein the judging step judges whether or not a print instruction is issued, and
the image forming apparatus further comprises a discrimination information transmission step of, in a case where it is judged that the print instruction is issued, transmitting discrimination information capable of specifying the scan ticket to the management server, so as to be able to use the scan ticket corresponding to the designated print job.

* * * * *